(12) United States Patent
Ikeda et al.

(10) Patent No.: US 12,449,818 B2
(45) Date of Patent: Oct. 21, 2025

(54) REMOTE CONTROLLER, REMOTE CONTROL SYSTEM, AND REMOTE CONTROL METHOD

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP); Yasuhiro Saito, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 18/659,131

(22) Filed: May 9, 2024

(65) Prior Publication Data

US 2024/0393798 A1  Nov. 28, 2024

(30) Foreign Application Priority Data

May 26, 2023  (JP) ................................ 2023-086687

(51) Int. Cl.
*G05D 1/225* (2024.01)
*G05D 1/249* (2024.01)
(Continued)

(52) U.S. Cl.
CPC ............. *G05D 1/225* (2024.01); *G05D 1/249* (2024.01); *G05D 1/693* (2024.01); *G05D 1/6987* (2024.01); *G08C 17/02* (2013.01); *G05D 2101/22* (2024.01)

(58) Field of Classification Search
CPC ........ G05D 1/225; G05D 1/249; G05D 1/693; G05D 1/6987; G05D 1/695; G05D 1/43; G05D 1/242; G05D 1/2435; G05D 1/633; G05D 1/644; G05D 1/648; G05D 1/65; G05D 2101/22; G05D 2107/70; G05D 2105/45; G05D 2109/10; G05D 2109/20; G05D 2111/10; G08C 17/02

See application file for complete search history.

(56) References Cited

U.S. PATENT DOCUMENTS 11,628,831 B2 * 4/2023 Diamond ............. G05D 1/0248
 701/23
2017/0320529 A1  11/2017 Nordbruch
2024/0378887 A1 * 11/2024 Verwoerd .............. G06V 40/23

FOREIGN PATENT DOCUMENTS

EP  1446678 B1 * 9/2007 ............. G08G 1/017
JP  2017-538619 A  12/2017

* cited by examiner

*Primary Examiner* — Michael J Zanelli
(74) *Attorney, Agent, or Firm* — Oliff PLC

(57) ABSTRACT

A remote controller includes: an acquisition unit; a detection unit; a control value generation unit; and a transmission unit. The control value generation unit generates a retreat control value if at least either one of a first case and a second case applies. The first case includes two or more moving objects overlapping each other in the sensor information. The second case includes establishing an expectation before sensor information acquisition that the two or more moving objects overlap each other when the sensor information is acquired. The retreat control value defines the running motion of at least any of the moving objects establishing a locational relationship allowing a detection subject moving object of the moving objects as a subject of detection using the sensor information to be detected by the detection unit without causing an overlap of the detection subject moving object with a different one of the moving objects.

13 Claims, 27 Drawing Sheets

(51) Int. Cl.
*G05D 1/693* (2024.01)
*G05D 1/698* (2024.01)
*G05D 101/00* (2024.01)
*G08C 17/02* (2006.01)

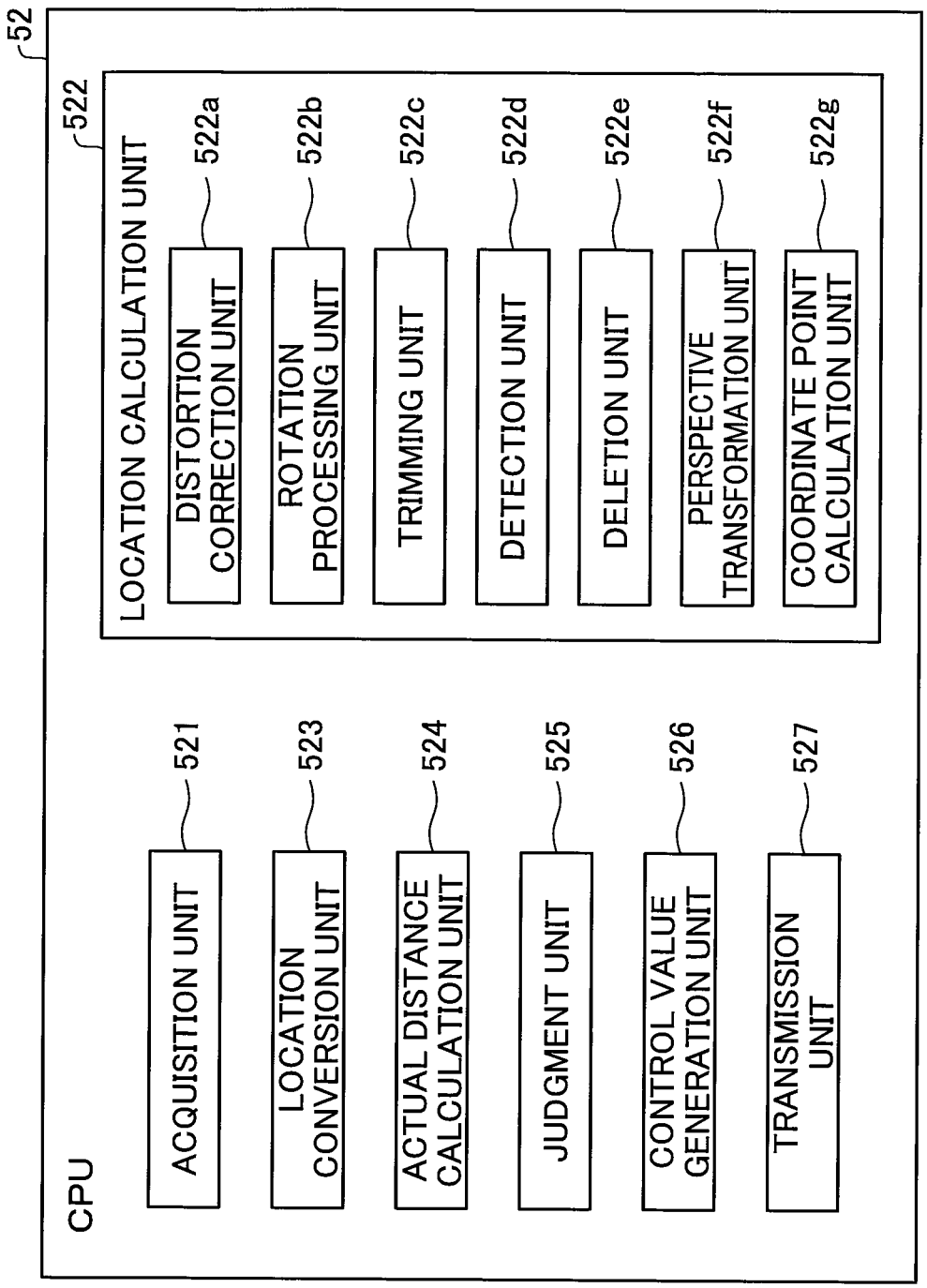

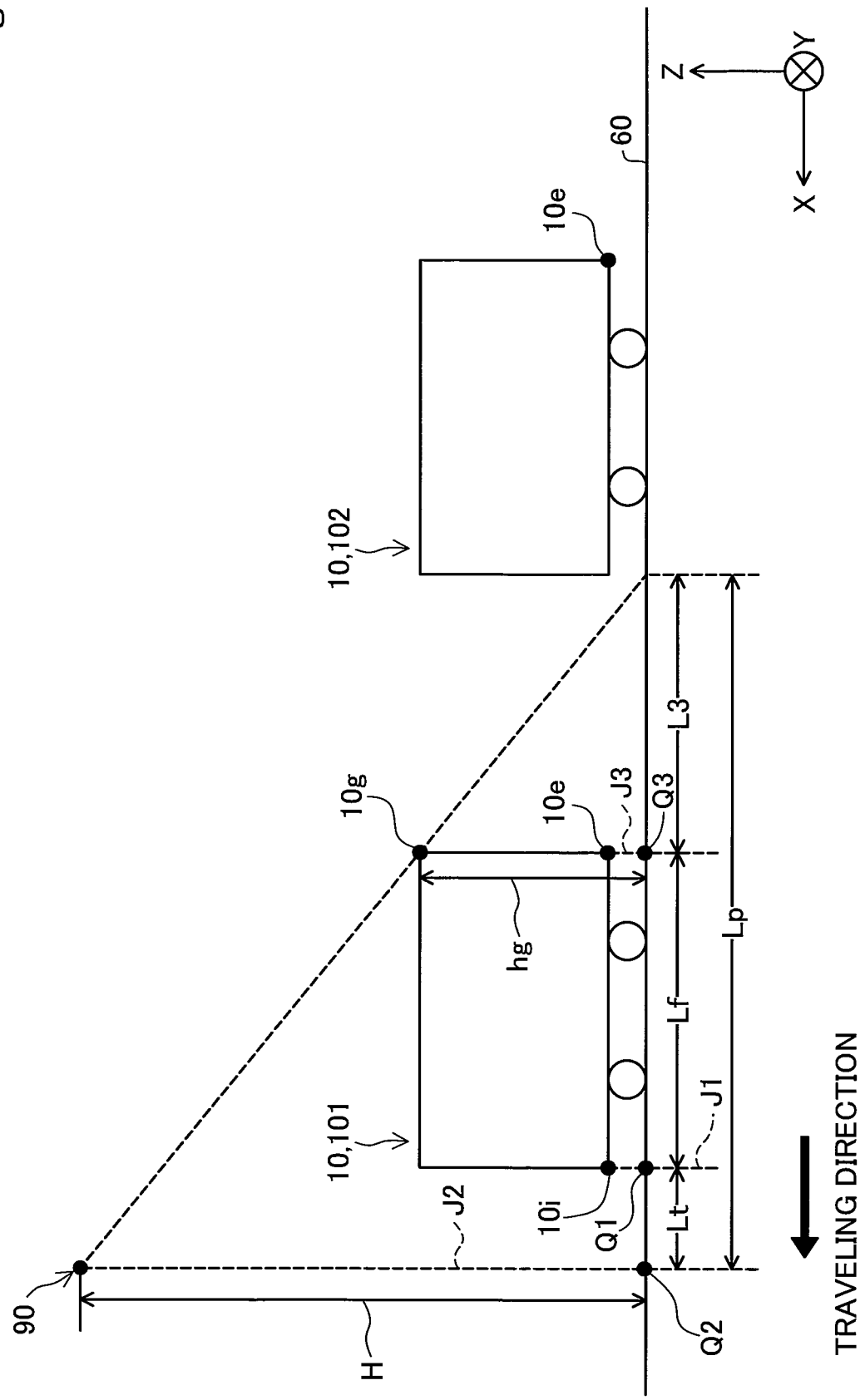

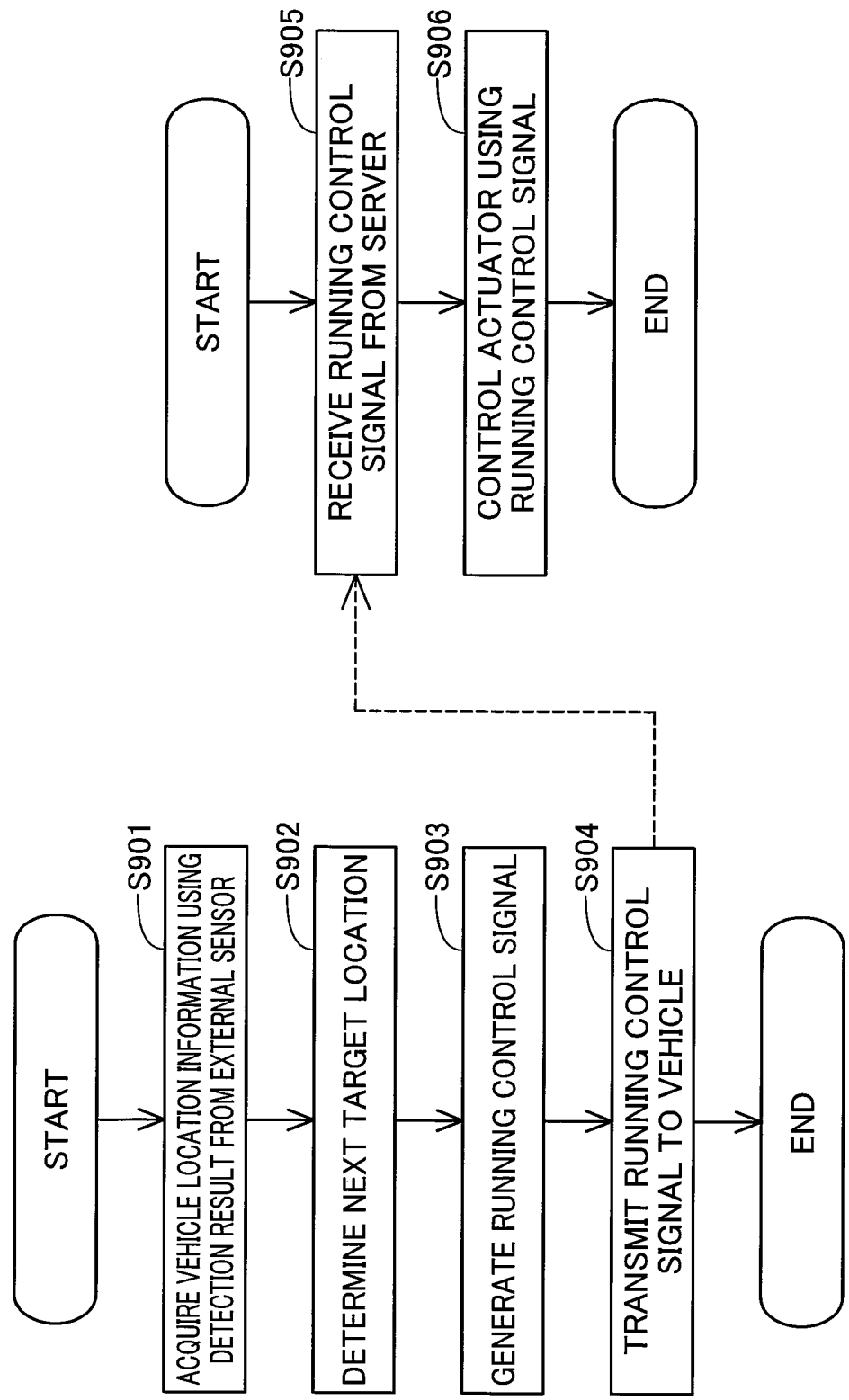

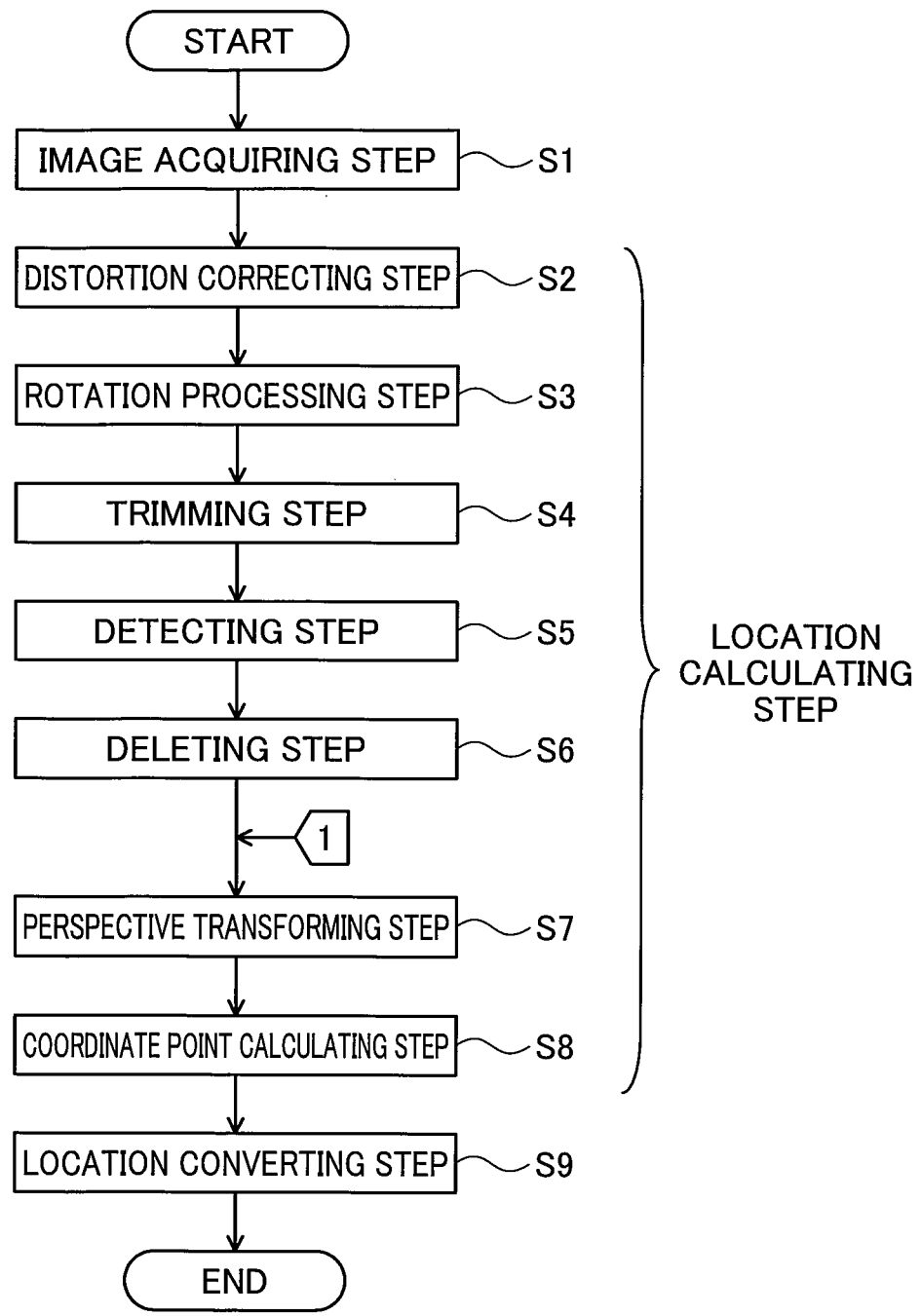

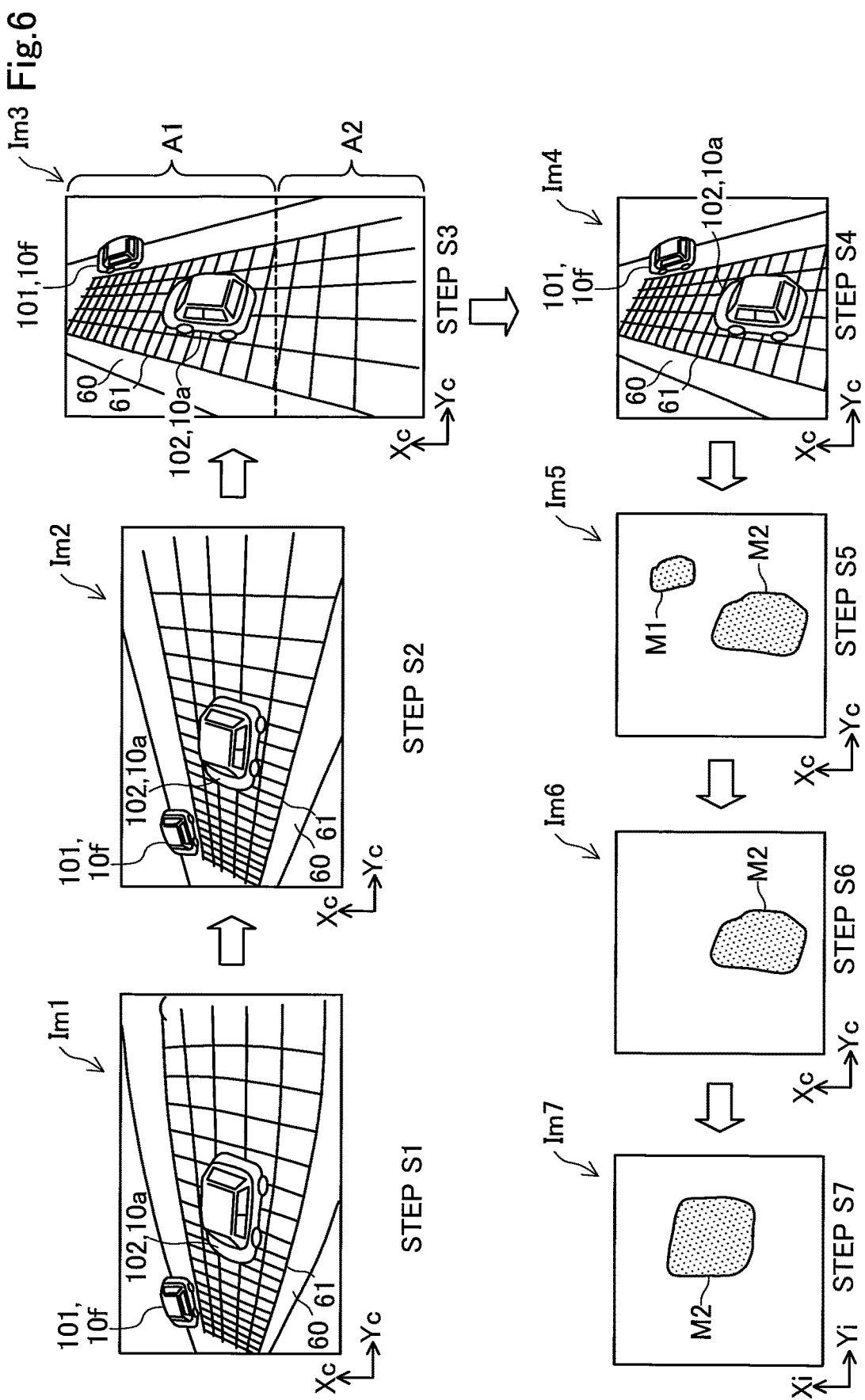

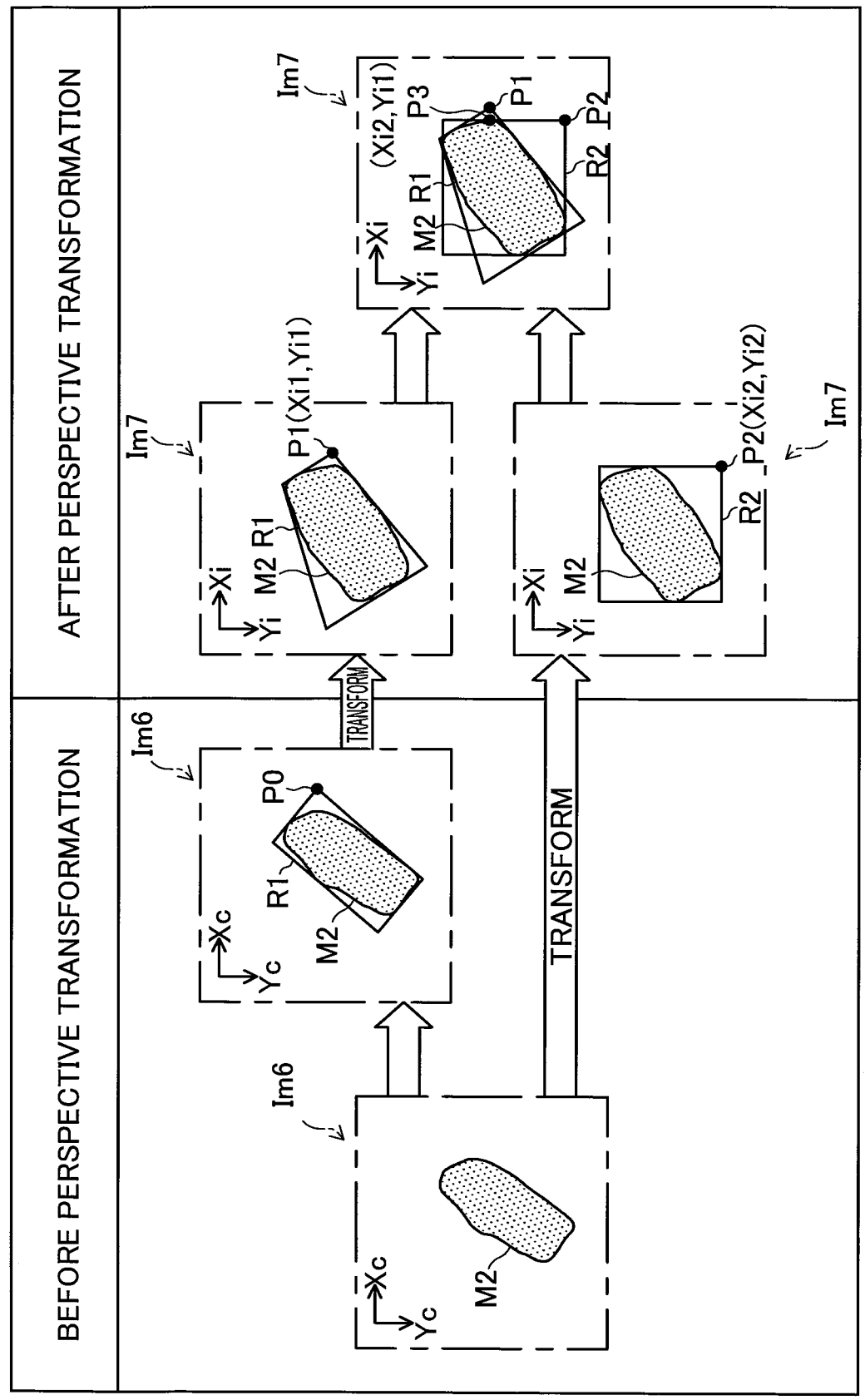

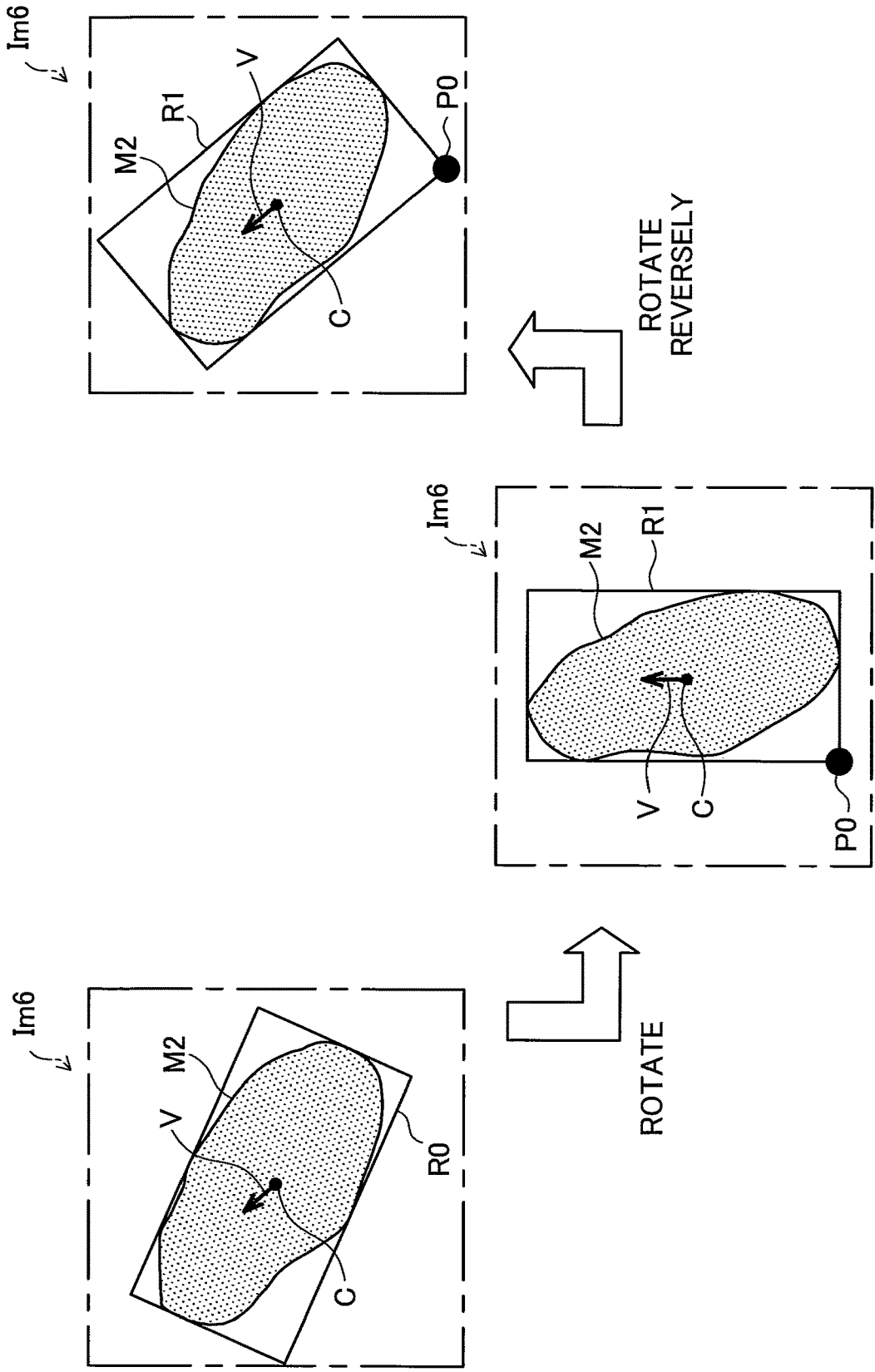

REMOTE CONTROLLER, REMOTE CONTROL SYSTEM, AND REMOTE CONTROL METHOD

CROSS REFERENCE TO RELATED APPLICATIONS

The present application claims priority from Japanese patent application No. 2023-086687 filed on May 26, 2023, the disclosure of which is hereby incorporated in its entirety by reference into the present application.

BACKGROUND

Field

The present disclosure relates to a remote controller, a remote control system, and a remote control method.

Related Art

A vehicle conventionally known runs automatically by remote control (patent literature 1). This technique causes a monitoring system such as a camera or a LIDAR installed at a place different from the vehicle to track running of the vehicle. By doing so, in the case of a situation such as malfunction of the vehicle, it becomes possible to remotely control motion of the vehicle before running of the vehicle is hindered.

SUMMARY

In tracking the location of the vehicle using a captured image acquired by a camera installed at a place different from the vehicle, the existence of two or more vehicles overlapping each other in the captured image may make it impossible to track the location of each vehicle correctly. Likewise, in tracking the location of the vehicle using LiDAR information acquired by a LIDAR installed at a place different from the vehicle, the existence of two or more vehicles overlapping each other in a range of detection by the LiDAR may make it impossible to track the location of each vehicle correctly. These are problems occurring not only in the case of vehicles but also in the case of moving objects.

The present disclosure is feasible in the following aspects.

(1) According to a first aspect of the present disclosure, a remote controller is provided. The remote controller remotely controls running motion of each of at least one of a plurality of moving objects, and comprises: an acquisition unit that acquires sensor information acquired by a sensor installed at a place different from the plurality of moving objects, the sensor information indicating the at least one of the plurality of moving objects; a detection unit that detects the moving object included in the sensor information; a control value generation unit that generates a control value for defining the running motion of each of the at least one of the plurality of moving objects using the sensor information; and a transmission unit that transmits the control value to a control subject moving object of the plurality of moving objects as a subject of control in the running motion. The control value generation unit generates a retreat control value if at least either one of a first case and a second case applies. The first case is a case where two or more of the moving objects of the plurality of moving objects overlap each other in the sensor information. The second case is a case where an expectation is established before acquisition of the sensor information that the two or more moving objects overlap each other when the sensor information is acquired. The retreat control value is generated as the control value for defining the running motion of at least any of the two or more moving objects in order to establish a locational relationship allowing a detection subject moving object of the two or more moving objects as a subject of detection using the sensor information to be detected by the detection unit without causing an overlap of the detection subject moving object with other of the plurality of moving objects. According to this aspect, if at least either one of the first case and the second case applies, it is possible to generate the retreat control value in order to establish a locational relationship allowing the detection subject moving object of the two or more moving objects to be detected without causing an overlap of the detection subject moving object with the different moving object. Furthermore, it is possible to transmit the generated retreat control value to the control subject moving object. This allows reduction in a likelihood that the two or more moving objects will overlap each other in the sensor information in tracking the location of the moving object using the sensor information indicating the moving object acquired by the sensor installed at a place different from the moving object. Thus, it is possible to track the location of the moving object more correctly using the sensor information.

(2) In the above-described aspect, the first case may be a case where a first moving object and a second moving object of the plurality of moving objects overlap each other in the sensor information, the second case may be a case where an expectation is established before acquisition of the sensor information that the first moving object and the second moving object overlap each other when the sensor information is acquired, the remote controller may further comprise an actual distance calculation unit that calculates an actual distance between the first moving object and the second moving object, and the retreat control value may be the control value for defining the running motion of at least one of the first moving object and the second moving object in order for the actual distance to become a target distance longer than the actual distance at a moment when at least either one of the first case and the second case applies. According to this aspect, it is possible to calculate the actual distance between the first moving object and the second moving object overlapping each other or expected to overlap each other in the sensor information. It is further possible to generate the retreat control value for defining running motion of at least one of the first moving object and the second moving object in order for the actual distance between the first moving object and the second moving object to become the target distance longer than the actual distance at a moment when at least either one of the first case and the second case applies. This makes it possible to reduce a likelihood more reliably that the first moving object and the second moving object will overlap each other in the sensor information in tracking the locations of the first moving object and the second moving object using the sensor information.

(3) In the above-described aspect, the target distance may be set in response to an appearance shape of the first moving object and an appearance shape of the second moving object, the target distance may become longer as the appearance shape of the first moving object and the appearance shape of the second moving object become larger, and the target distance may become shorter as the appearance shape of the first moving object and the appearance shape of the second moving object become smaller. According to this aspect, it is possible to set the target distance in response to the appearance shape of the first moving object and the appearance shape of the second moving object. This allows setting of the target distance responsive to the appearance shape of the moving object having correlation with an area occupied by the moving object in the sensor information. By doing so, it becomes possible to make it unlikely that accuracy of calculating the location of the moving object will be reduced depending on the type of the moving object. It further becomes possible to reduce the occurrence of failing to track the location of the moving object.

(4) In the above-described aspect, the second moving object may be the moving object running behind the first moving object in the same forward traveling direction as the first moving object, and the retreat control value may include at least one of: an acceleration control value for increasing an acceleration of the first moving object in the forward traveling direction; an acceleration control value for reducing an acceleration of the second moving object in the forward traveling direction; a direction control value for moving the second moving object backward in a direction opposite the forward traveling direction; and a stop control value for stopping the running motion of the second moving object. According to this aspect, if the second moving object runs behind the first moving object in the same forward traveling direction as the first moving object, it is possible to generate the retreat control value including the acceleration control value for increasing the acceleration of the first moving object in the forward traveling direction. Thus, controlling the acceleration of the first moving object allows the actual distance between the first moving object and the second moving object to be changed to the target distance. Furthermore, according to this aspect, it is possible to generate the retreat control value including the acceleration control value for reducing the acceleration of the second moving object in the forward traveling direction. Thus, controlling the acceleration of the second moving object allows the actual distance between the first moving object and the second moving object to be changed to the target distance. Furthermore, according to this aspect, it is possible to generate the retreat control value including the direction control value for moving the second moving object backward in the direction opposite the forward traveling direction. Thus, causing the second moving object to run backward in the backward traveling direction opposite the forward traveling direction allows the actual distance between the first moving object and the second moving object to be changed to the target distance. Furthermore, according to this aspect, it is possible to generate the retreat control value including the stop control value for stopping the running motion of the second moving object. Thus, stopping the second moving object allows the actual distance between the first moving object and the second moving object to be changed to the target distance.

(5) In the above-described aspect, the retreat control value may further include a rudder angle control value for defining a rudder angle of the control subject moving object. According to this aspect, it is possible to generate the retreat control value including the rudder angle control value for defining the rudder angle of the moving object in addition to at least any of the acceleration control value, the direction control value, and the stop control value. Thus, it is possible to correct locational deviation from a predetermined target running route during a course of changing the actual distance between the first moving object and the second moving object to the target distance.

(6) In the above-described aspect, the retreat control value may include a rudder angle control value for defining a rudder angle of the control subject moving object in order to move either one of the first moving object and the second moving object in a width direction of a track. According to this aspect, it is possible to generate the retreat control value including the rudder angle control value for moving either one of the first moving object and the second moving object in the width direction of the track. Thus, moving either one of the first moving object and the second moving object in the width direction of the track allows the actual distance between the first moving object and the second moving object to be changed to the target distance.

(7) In the above-described aspect, the retreat control value may further include an acceleration control value for defining an acceleration of the control subject moving object. According to this aspect, it is possible to generate the retreat control value including the acceleration control value in addition to the rudder angle control value for moving either one of the first moving object and the second moving object in the width direction of the track. Thus, it is possible to adjust a moving speed in moving either one of the first moving object and the second moving object in the width direction of the track.

(8) In the above-described aspect, the second moving object may be the moving object running behind the first moving object in the same forward traveling direction as the first moving object, and the retreat control value may be the control value for causing the second moving object to pass the first moving object by moving either one of the first moving object and the second moving object in a width direction of a track and may include an acceleration control value for defining an acceleration of the control subject moving object and a rudder angle control value for defining a rudder angle of the control subject moving object. According to this aspect, if the second moving object runs behind the first moving object in the same forward traveling direction as the first moving object, it is possible to generate the following retreat control value. In this case, it is possible to generate the retreat control value including the acceleration control value and the rudder angle control value for causing the second moving object to pass the first moving object by moving either one of the first moving object and the second moving object in the width direction of the track. Thus, causing the second moving object to pass the first moving object allows the actual distance between the first moving object and the second moving object to be changed to the target distance.

(9) In the above-described aspect, the retreat control value may include an orbit control value for defining a running path by arranging predetermined time-based target running locations of the control subject moving object in chronological order. According to this aspect, it is possible to generate the retreat control value including the orbit control value for defining the running path of the control subject moving object by arranging the predetermined time-based target running locations of the control subject moving object in chronological order. Thus, it is possible to define the running path of the control subject moving object without defining running motion in detail in terms of an acceleration, a rudder angle, etc.

(10) In the above-described aspect, the remote controller may comprise a judgment unit that judges whether the second case applies in response to the type of each of the two or more moving objects expected to be included in the sensor information when the sensor information is acquired. According to this aspect, it is possible to judge whether the second case applies in response to the type of each of the two or more moving objects expected to be included in the sensor information when the sensor information is acquired. Thus, it is possible to more reliably judge whether the second case applies.

(11) In the above-described aspect, the remote controller may comprise a judgment unit that judges whether the second case applies in response to an appearance shape of the moving object differing between the types of the moving objects. The appearance shape is an appearance shape of each of the two or more moving objects expected to be included in the sensor information when the sensor information is acquired. According to this aspect, it is possible to judge whether the second case applies in response to the appearance shape of the moving object differing between the types of the moving objects. The appearance shape is an appearance shape of each of the two or more moving objects expected to be included in the sensor information when the sensor information is acquired. Thus, it is possible to still more reliably judge whether the second case applies.

(12) According to a second aspect of the present disclosure, a remote control system is provided. The remote control system comprises: a plurality of moving objects: a sensor installed at a place different from the plurality of moving objects, the sensor acquiring sensor information indicating at least one of the plurality of moving objects; and the remote controller according to the above-described aspect. According to this aspect, if at least either one of the first case and the second case applies, it is possible to generate the retreat control value in order to establish a locational relationship allowing the detection subject moving object of the two or more moving objects to be detected without causing an overlap of the detection subject moving object with the different moving object. Furthermore, it is possible to transmit the generated retreat control value to the control subject moving object. This allows reduction in a likelihood that the two or more moving objects will overlap each other in the sensor information in tracking the location of the moving object using the sensor information indicating the moving object acquired by the sensor installed at a place different from the moving object. Thus, it is possible to track the location of the moving object more correctly using the sensor information.

(13) According to a third aspect of the present disclosure, a remote control method is provided. The remote control method is a method of remotely controlling running motion of each of at least one of a plurality of moving objects, and comprises: an acquiring step of acquiring sensor information acquired by a sensor installed at a place different from the plurality of moving objects, the sensor information indicating the at least one of the plurality of moving objects; a detecting step of detecting the moving object included in the sensor information; a control value generating step of generating a control value for defining the running motion of each of the at least one of the plurality of moving objects using the sensor information; and a transmitting step of transmitting the control value to a control subject moving object of the plurality of moving objects as a subject of control in the running motion. In the control value generating step, a retreat control value is generated if at least either one of a first case and a second case applies. The first case is a case where two or more of the moving objects of the plurality of moving objects overlap each other in the sensor information. The second case is a case where an expectation is established before acquisition of the sensor information that the two or more moving objects overlap each other when the sensor information is acquired. The retreat control value is generated as the control value for defining the running motion of at least any of the two or more moving objects in order to establish a locational relationship allowing a detection subject moving object of the two or more moving objects as a subject of detection using the sensor information to be detected in the detecting step without causing an overlap of the detection subject moving object with other of the plurality of moving objects. According to this aspect, if at least either one of the first case and the second case applies, it is possible to generate the retreat control value in order to establish a locational relationship allowing the detection subject moving object of the two or more moving objects to be detected without causing an overlap of the detection subject moving object with the different moving object. Furthermore, it is possible to transmit the generated retreat control value to the control subject moving object. This allows reduction in a likelihood that the two or more moving objects will overlap each other in the sensor information in tracking the location of the moving object using the sensor information indicating the moving object acquired by the sensor installed at a place different from the moving object. Thus, it is possible to track the location of the moving object more correctly using the sensor information.

The present disclosure is feasible in various aspects other than the remote controller, the remote control system, and the remote control method described above. For example, the present disclosure is feasible in aspects including a method of manufacturing a remote controller, a method of controlling a remote controller and a remote control system, a computer program realizing such a control method, and a non-transitory recording medium storing such a computer program.

BRIEF DESCRIPTION OF THE DRAWINGS

FIG. 3 is a view showing details of a CPU provided at the remote controller;

FIG. 4A is a view showing an example of a method of setting a target distance;

FIG. 4B is a flowchart showing a processing procedure of running control over a vehicle according to a first embodiment;

FIG. 5 is a flowchart showing a method of calculating the location of a detection subject vehicle using a captured image;

FIG. 6 is a schematic view showing examples of various types of images resulting from implementation of the location calculating method shown in FIG. 5;

FIG. 7 is a view for explaining details of a coordinate point calculating step;

FIG. 8 is a view for explaining a method of acquiring a base coordinate point;

DETAILED DESCRIPTION

A. First Embodiment

A-1. Configuration of Remote Control System

Figure 1:
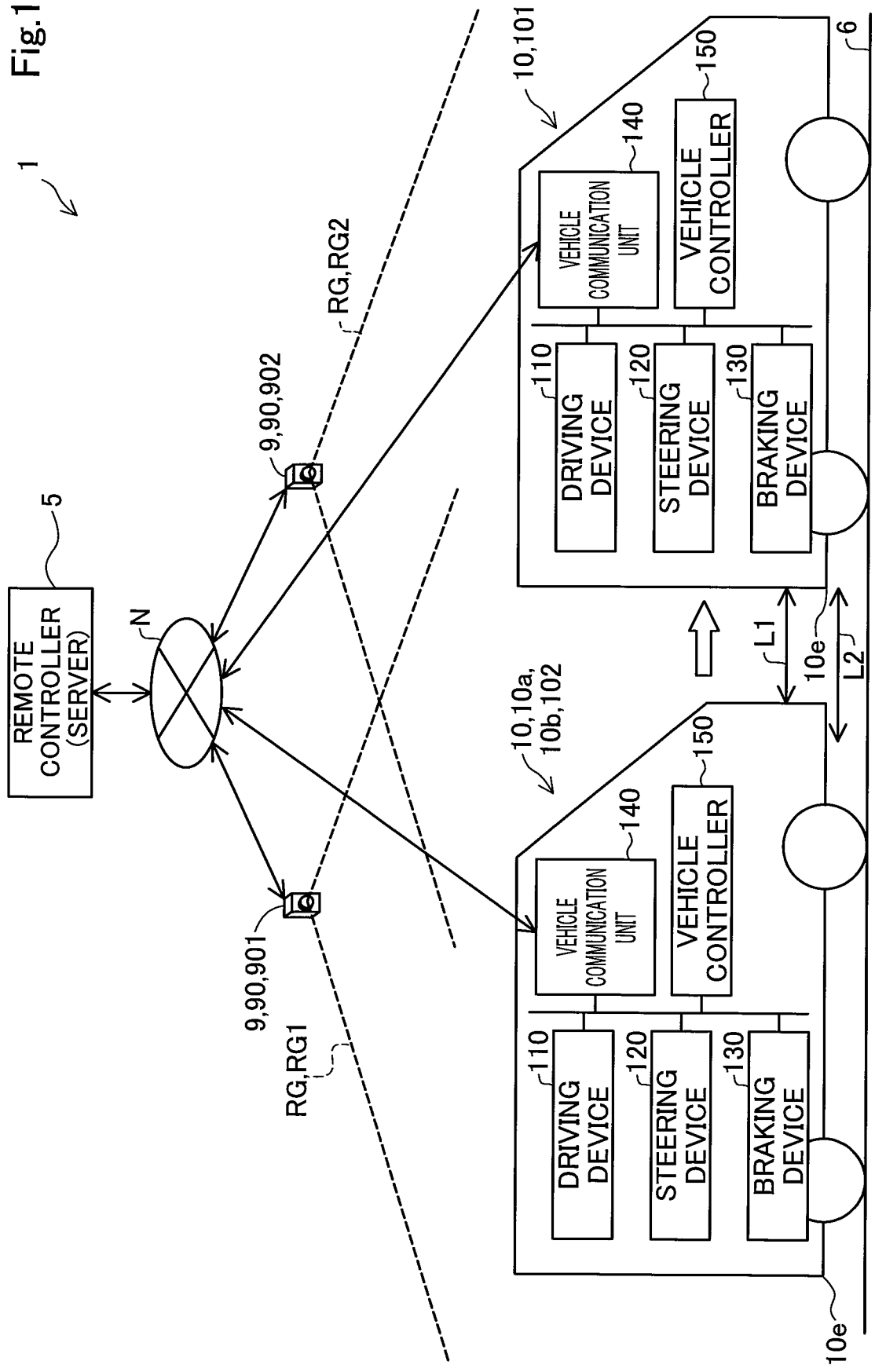
FIG. 1 is a view showing a schematic configuration of a remote control system.

FIG. 1 is a view showing a schematic configuration of a remote control system 1. The remote control system 1 includes a vehicle 10 as one or more moving objects, a remote controller 5 as a server that remotely controls running motion of at least one of a plurality of vehicles 10, and one or more types of sensors (hereinafter called external sensors 9) installed at places different from the plurality of vehicles 10.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 10 is configured to be capable of running by unmanned driving. The "unmanned driving" means driving independent of running operation by a passenger. The running operation means operation relating to at least one of "run," "turn," and "stop" of the vehicle 10. The unmanned driving is realized by automatic remote control or manual remote control using a device provided outside the vehicle 10 or by autonomous control by the vehicle 10. A passenger not involved in running operation may be on-board a vehicle running by the unmanned driving. The passenger not involved in running operation includes a person simply sitting in a seat of the vehicle 10 and a person doing work such as assembly, inspection, or operation of switches different from running operation while on-board the vehicle 10. Driving by running operation by a passenger may also be called "manned driving."

In the present specification, the "remote control" includes "complete remote control" by which all motions of the vehicle 10 are completely determined from outside the vehicle 10, and "partial remote control" by which some of the motions of the vehicle 10 are determined from outside the vehicle 10. The "autonomous control" includes "complete autonomous control" by which the vehicle 10 controls a motion of the vehicle 10 autonomously without receiving any information from a device outside the vehicle 10, and "partial autonomous control" by which the vehicle 10 controls a motion of the vehicle 10 autonomously using information received from a device outside the vehicle 10.

The external sensor 9 acquires information indicating the at least one of the plurality of vehicles 10 (hereinafter called sensor information). More specifically, the external sensor 9 acquires overhead information indicating the state of the vehicle 10 and a state in a peripheral region around the vehicle 10. In the present embodiment, the external sensor 9 is an image capturing device 90. The image capturing device 90 acquires a captured image by capturing an image of a detection range RG covering the vehicle 10 from outside the vehicle 10. The image capturing device 90 transmits the captured image to the remote controller 5 together with camera identification information for identifying a plurality of the image capturing devices 90 and time of acquisition of the captured image. The captured image transmitted to the remote controller 5 is used for calculating the location of the vehicle 10. The captured image is a two-dimensional image with a group of pixels arranged in an XcYc plane in a camera coordinate system. The camera coordinate system is a coordinate system having an origin defined by a focal point of the image capturing device 90, and coordinate axes indicated by an Xc axis and a Yc axis perpendicular to the Xc axis. The captured image includes at least two-dimensional data about the vehicle 10 as a subject vehicle to be subjected to calculation of a location. While the captured image is preferably a color image, it may also be a grayscale image. The image capturing device 90 is a camera including, for example, an image capturing element such as a CCD image sensor or a CMOS image sensor, and an optical system.

In the present embodiment, the image capturing device 90 acquires a captured image including a track 6 and the vehicle 10 running along the track 6 viewed from above. A location for installing the image capturing device 90 and the number of the image capturing devices 90 are determined in consideration of the detection range RG (angle of view) of the image capturing device 90, for example, in order to capture an image of the track 6 in its entirety using one or more image capturing devices 90. More specifically, the image capturing devices 90 are installed in such a manner as to provide an overlap between a first detection range RG1 corresponding to the detection range RG of a first image capturing device 901 and a second detection range RG2 corresponding to the detection range RG of a second image capturing device 902 next to the first image capturing device 901. Furthermore, each image capturing device 90 is installed at a location allowing capturing of an image of a positioning point 10e set in advance on a particular part of the vehicle 10 to run along the track 6. In the present embodiment, the positioning point 10e is a rear end on the left side of the vehicle 10 (hereinafter called a left rear end). The positioning point 10e may be provided at a part other than the left rear end of the vehicle 10. The image capturing device 90 may acquire information obtained from the front, back, or side of the vehicle 10 in addition to the information acquired from above the vehicle 10.

The vehicle 10 has a manned driving mode and a remote driverless mode. In the manned driving mode, a driver on the vehicle 10 operates an input device such as a steering wheel or an accelerator provided in the vehicle 10 to generate a running condition for the vehicle 10. This causes the vehicle 10 to run under the generated running condition. The running condition is a condition for defining running motion of the vehicle 10. The running condition includes a running route, a location, a running speed, an acceleration, and a rudder angle of a wheel of the vehicle 10, for example. In the remote driverless mode, the vehicle 10 receives the running condition for the vehicle 10 from outside the vehicle 10, and runs under the received running condition. The remote driverless mode includes a remote manual driving mode and a remote automatic driving mode. In the remote manual driving mode, an operator operates an operator input device installed at a place different from the vehicle 10 to generate the running condition for the vehicle 10. By doing so, the vehicle 10 receives the running condition generated by the operator input device, and runs under the received running condition. In the remote automatic driving mode, the remote controller 5 installed at a place different from the vehicle 10 generates a control value for defining running motion of the vehicle 10, and transmits the generated control value to the vehicle 10. By doing so, the vehicle 10 receives the control value, and runs automatically in response to the received control value.

The vehicle 10 runs in the remote automatic driving mode in a factory that produces the vehicle 10 by performing a plurality of production steps, for example. The factory is not limited to a case where the factory is present in one building, to a case where the factory is located at one site or one address, etc., but the factory may extend across a plurality of buildings, a plurality of sites, or a plurality of addresses, for example. In such cases, the vehicle 10 may run not only on a private road but also on a public road. The vehicle 10 may run outside the factory in the remote automatic driving mode.

The vehicle 10 is a battery electric vehicle, a hybrid vehicle, a fuel cell vehicle, a gasoline vehicle, or a diesel vehicle, for example. The vehicle 10 may be a private vehicle such as a passenger car, or a business vehicle such as a truck, a bus, or a vehicle for construction, for example. The vehicle 10 is simply required to be at least any of a finished item as a product, a semifinished product, and an in-process item.

The vehicle 10 includes a driving device 110 for accelerating the vehicle 10, a steering device 120 for changing a traveling direction of the vehicle 10, and a braking device 130 for decelerating the vehicle 10. The vehicle 10 further includes a vehicle communication unit 140 for communicating with an external unit via radio communication or the like, and a vehicle controller 150. The external unit includes a different device other than the own vehicle 10 such as the remote controller 5 and the image capturing device 90, and a different vehicle 10. The vehicle communication unit 140 is a radio communication device, for example. The vehicle communication unit 140 communicates with the external unit connected to a network N via an access point in the factory, for example. The vehicle controller 150 includes a CPU, a storage unit, and an input/output interface. The CPU, the storage unit, and the input/output interface are connected to each other via an internal bus or an interface circuit. The input/output interface communicates with an internal unit mounted on the own vehicle 10 such as the driving device 110. The input/output interface is communicably connected to the vehicle communication unit 140. The configuration of the vehicle 10 is not limited to the above. At least some of the functions of the vehicle controller 150 may be realized as one function of the remote controller 5 or that of the external sensor 9.

Figure 2:
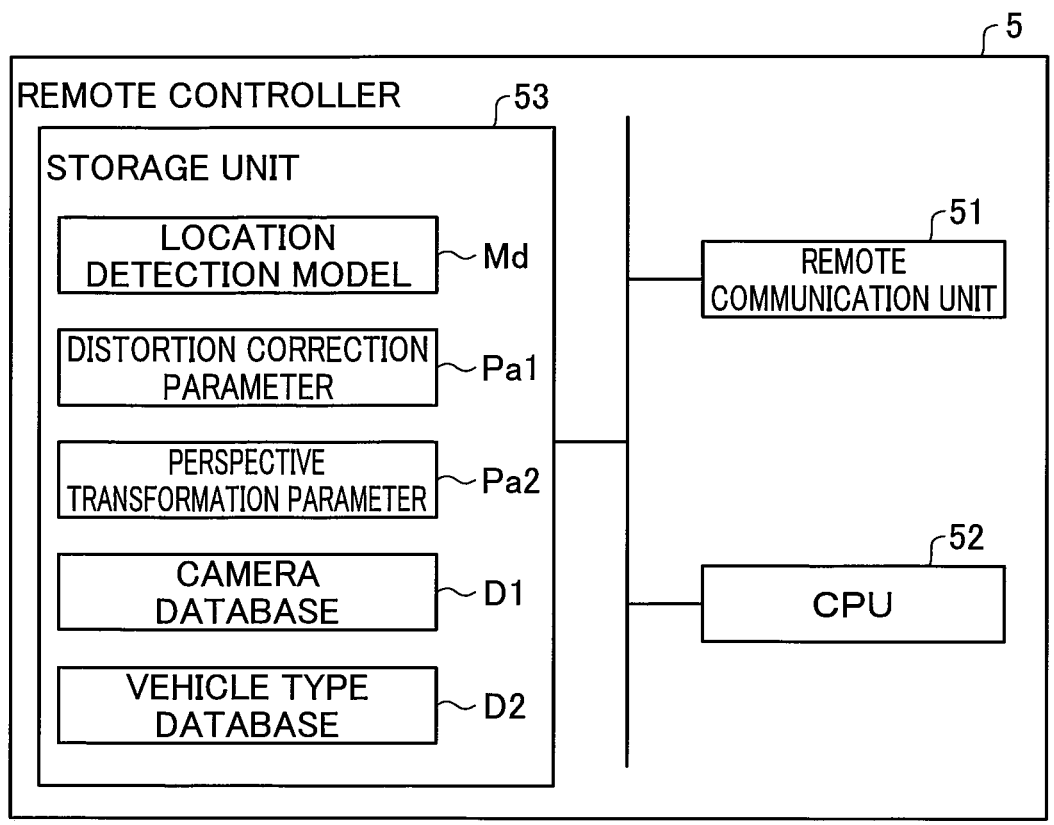
FIG. 2 is a view showing a schematic configuration of a remote controller.

FIG. 2 is a view showing a schematic configuration of the remote controller 5 as a server. The remote controller 5 controls running motion of the vehicle 10 using sensor information. In the present embodiment, using a captured image as the sensor information acquired by the image capturing device 90 as the external sensor 9, the remote controller 5 calculates the location of a detection subject vehicle 10a included in the captured image. The detection subject vehicle 10a is the vehicle 10 to be detected using the sensor information. The detection subject vehicle 10a may be set in advance, or may be set properly on the basis of at least one of data generated during a course of calculation of the location of the vehicle 10 and result of the calculation about the location of the vehicle 10. In the present embodiment, the detection subject vehicle 10a is the vehicle 10 existing at least partially in a predetermined recognition subject region defined in advance. The recognition subject region is a region with grid lines 61 indicated in FIG. 6 referred to later, for example. The remote controller 5 employs the location of the positioning point 10e predetermined at the detection subject vehicle 10a as the location of the detection subject vehicle 10a. Then, the remote controller 5 generates a control value for defining running motion of a control subject vehicle 10b using a running condition such as the calculated location of the detection subject vehicle 10a. The control subject vehicle 10b is the vehicle 10 included in the sensor information and is the vehicle 10 to be controlled in terms of running motion. The control subject vehicle 10b and the detection subject vehicle 10a may be the same vehicle or may be different vehicles. The remote controller 5 transmits the generated control value to the control subject vehicle 10*b*. By doing so, the remote controller 5 controls running motion of the control subject vehicle 10*b* included in the captured image.

The remote controller 5 includes a remote communication unit 51, a storage unit 53, and a CPU 52. The remote communication unit 51, the storage unit 53, and the CPU 52 are connected to each other via an internal bus or an interface circuit. The remote communication unit 51 communicably connects the remote controller 5 to the vehicle controller 150 and the image capturing device 90. The remote communication unit 51 is a radio communication device, for example.

The storage unit 53 of the remote controller 5 stores various types of information including various programs for controlling motion of the remote controller 5, a location detection model Md, a distortion correction parameter Pa1, a perspective transformation parameter Pa2, a camera database D1, and a vehicle type database D2. The storage unit 53 includes a RAM, a ROM, and a hard disk drive (HDD), for example.

The location detection model Md is a learned machine learning model used for identifying the location of the detection subject vehicle 10*a* included in the captured image. In the present embodiment, the location detection model Md is a machine learning model subjected to machine learning previously in such a manner that, in response to input of either one of a captured image and each type of image resulting from a corresponding process on the captured image, the vehicle 10 in the input image is masked. The location detection model Md uses an algorithm that is a deep neural network (hereinafter called DNN) having a configuration of a convolution neural network (hereinafter called CNN) to realize semantic segmentation or instance segmentation, for example. An example of the DNN used as the algorithm for the location detection model Md is a DNN to implement instance segmentation such as YOLACT++. The configuration of the location detection model Md is not limited to the above. The location detection model Md may be a learned machine learning model using an algorithm other than a neural network, for example.

The distortion correction parameter Pa1 is a parameter used in correcting distortion in the captured image. The perspective transformation parameter Pa2 is a parameter used in perspective transforming a first mask image. The first mask image is an image with a mask region added to the vehicle 10 in an image input to the location detection model Md formed by masking the vehicle 10 in the input image. The correction parameter Pa1 and the perspective transformation parameter Pa2 will be described in detail later.

The camera database D1 is a database indicating an image capturing parameter for each image capturing device 90 calculated on the basis of a location of installation of the image capturing device 90 in a global coordinate system. In the present embodiment, the image capturing parameter is a height H of the image capturing device 90 from a road surface 60 (see FIG. 9 referred to later), which is a height H to the road surface 60 where the detection subject vehicle 10*a* exists. The camera database D1 is a database containing association between camera identification information and the image capturing parameter for the image capturing device 90 identified by the camera identification information. The configuration of the camera database D1 is not limited to the above. In the camera database D1 the detection range RG, a location of installation, an installation angle, etc. of the image capturing device 90 may be associated with the camera identification information.

The vehicle type database D2 is a database containing shape information. The shape information is information indicating an appearance shape of the vehicle 10 on the basis of each type of the vehicle 10. As an example, the shape information is information containing association between vehicle type identification information for identifying two or more types of the vehicles 10 and an appearance shape of the vehicle 10 of a type identified using the vehicle type identification information. An appearance shape of the vehicle 10 is defined by a body shape of the vehicle 10, and a vehicle class (also called a "vehicle body") determined by a total length, a vehicle width, and a vehicle height of the vehicle 10, and differs between types of the vehicles 10. The configuration of the vehicle type database D2 is not limited to the above. At least part of the various types of information stored in the storage unit 53 may be stored in the storage unit of the vehicle controller 150 or that of the image capturing device 90, for example.

FIG. 3 is a view showing details of the CPU 52 provided at the remote controller 5. The CPU 52 develops the programs stored in the storage unit 53 to function as an acquisition unit 521, a location calculation unit 522, a location conversion unit 523, an actual distance calculation unit 524, a judgment unit 525, a control value generation unit 526, and a transmission unit 527.

The acquisition unit 521 acquires various types of information. The acquisition unit 521 acquires sensor information acquired by the external sensor 9, for example. In the present embodiment, the acquisition unit 521 acquires a captured image as sensor information acquired by the image capturing device 90 as the external sensor 9. Furthermore, the acquisition unit 521 acquires an image capturing parameter about the image capturing device 90 as a source of acquisition of the captured image to be analyzed by referring to the camera database D1 stored in the storage unit 53, for example.

The location calculation unit 522 calculates a local coordinate point using the captured image. The local coordinate point is a coordinate point indicating the location of the detection subject vehicle 10*a* in a local coordinate system described later. The location calculation unit 522 includes a distortion correction unit 522*a*, a rotation processing unit 522*b*, a trimming unit 522*c*, a detection unit 522*d*, a deletion unit 522*e*, a perspective transformation unit 522*f*, and a coordinate point calculation unit 522*g*. The distortion correction unit 522*a* generates a corrected image by correcting distortion in the captured image. The rotation processing unit 522*b* generates a rotated image by rotating the corrected image in such a manner that a vector indicating a moving direction of the detection subject vehicle 10*a* (hereinafter called a moving vector) is pointed in a predetermined direction. Of all regions in the rotated image, the trimming unit 522*c* trims a region (hereinafter called an unnecessary region) from the rotated image other than a region (hereinafter called a necessary region) including a vehicle region corresponding to the detection subject vehicle 10*a* and a predetermined peripheral region around the detection subject vehicle 10*a*. By doing so, the trimming unit 522*c* generates a processed image with the necessary region cut out from the rotated image. In the present embodiment, if the detection subject vehicle 10*a* has moved a distance exceeding a predetermined threshold, the trimming unit 522*c* trims a moved region responsive to the distance of moving of the detection subject vehicle 10*a* from the rotated image, which is a moved region as the unnecessary region. By doing so, the trimming unit 522*c* generates a processed image with an unmoved region including the detection subject vehicle 10*a* cut out from the rotated image, which is an unmoved region as the necessary region. The detection unit 522*d* generates the first mask image by detecting a vehicle included in the processed image using the location detection model Md. If the first mask image includes a plurality of the vehicles 10, the deletion unit 522*e* deletes a mask region corresponding to a different one of the vehicles 10 (hereinafter called an exception vehicle 10*f*) other than the detection subject vehicle 10*a* from the first mask image. The exception vehicle 10*f* is the vehicle 10 belonging to the vehicles 10 included in the captured image or the vehicles 10 expected to be included in the captured image, and having the positioning point 10*e* made undetectable by being overlapped with a different one of vehicles 10 in such a manner as to be covered at the positioning point 10*e* in the captured image, for example. The exception vehicle 10*f* may also be the vehicle 10 existing beyond the recognition subject region, for example. The perspective transformation unit 522*f* generates a second mask image by perspective transforming the first mask image. The coordinate point calculation unit 522*g* calculates a local coordinate point by correcting a first coordinate point using a second coordinate point. The first coordinate point is a coordinate point in a local coordinate system indicating a designated vertex of a first circumscribed rectangle set at a mask region in the first mask image. The second coordinate point is a coordinate point in a local coordinate system indicating a vertex of vertexes of a second circumscribed rectangle set at a mask region in the second mask image, which is a vertex indicating the same location as the first coordinate point. The configuration of the location calculation unit 522 is not limited to the above.

The location conversion unit 523 converts the local coordinate point to a vehicle coordinate point using the image capturing parameter acquired by the acquisition unit 521 and the local coordinate point calculated by the location calculation unit 522. The vehicle coordinate point is a coordinate point indicating the location of the detection subject vehicle 10*a* in the global coordinate system.

The actual distance calculation unit 524 calculates an actual distance (hereinafter called an actual distance L1) between a first vehicle 101 and a second vehicle 10 as the vehicles 10 included in the sensor information. The actual distance calculation unit 524 calculates the actual distance L1 between the first vehicle 101 and the second vehicle 102, for example, by using information acquired by a vehicle-mounted sensor mounted on each of the first vehicle 101 and the second vehicle 102. The vehicle-mounted sensor is a vehicle-mounted camera, a vehicle-mounted radar, or a vehicle-mounted LiDAR, for example. In the illustration in FIG. 1, the second vehicle 102 runs behind the first vehicle 101 in the same traveling direction as the first vehicle 101 along the same lane as the first vehicle 101. However, the second vehicle 102 is not limited to this. The second vehicle 102 may be the vehicle 10 running ahead of the first vehicle 101 or may be the vehicle 10 running along a different lane from the first vehicle 101. A method of calculating the actual distance L1 between the first vehicle 101 and the second vehicle 102 is not limited to the above. The actual distance calculation unit 524 may calculate the actual distance L1 between the first vehicle 101 and the second vehicle 102 by analyzing an image such as the second mask image, for example. The actual distance calculation unit 524 may calculate the actual distance L1 between the first vehicle 101 and the second vehicle 102 using respective vehicle coordinate points or running speeds of the first vehicle 101 and the second vehicle 102, or using a period of time elapsed from acquisition of a captured image used for calculating the vehicle coordinate points, for example.

The judgment unit 525 judges whether at least either one of a first case and a second case applies. The first case is a case where two or more vehicles 10 of a plurality of vehicles overlap each other in the sensor information. The judgment unit 525 judges whether the first case applies by analyzing the sensor information acquired by the acquisition unit 521, for example. If the sensor information is a captured image as in the present embodiment, the judgment unit 525 judges whether two or more vehicles 10 overlap each other using a duplicate detection model, for example. The duplicate detection model is a learned machine learning model subjected to machine learning previously in such a manner that, in response to input of either one of a captured image and each type of image resulting from a corresponding process on the captured image, it becomes possible to judge whether two or more vehicles 10 overlap each other in the input image. The duplicate detection model uses an algorithm that is a DNN having a configuration of a CNN to realize instance segmentation, for example. The duplicate detection model may be realized as one function of the location detection model Md. The judgment unit 525 may judge whether the first case applies by a method different from that described above. The judgment unit 525 may judge whether the first case applies using at least one of data generated during a course of calculation of the location of the vehicle 10 and result of the calculation about the location of the vehicle 10, for example.

The second case is a case where an expectation is established before acquisition of the sensor information that two or more vehicles 10 overlap each other on the assumption that the sensor information is acquired. For example, the judgment unit 525 judges whether the second case applies on the basis of the types of two or more vehicles 10 expected to be included in the sensor information when the sensor information is acquired, for example. More specifically, the judgment unit 525 first judges whether two or more vehicles 10 are expected to be included in the sensor information when the sensor information is acquired on the basis of a running condition such as a running speed and a location at a certain moment of each vehicle 10, for example. Then, if the two or more vehicles 10 are expected to be included in the sensor information, the judgment unit 525 identifies vehicle type identification information indicating the type of each of the two or more vehicles 10 expected to be included in the sensor information. At this time, the judgment unit 525 uses schedule information, for example, in identifying the type of each of the two or more vehicles 10 expected to be included in the sensor information. The schedule information is information indicating the type of the vehicle 10, a location along a predetermined target running route where this vehicle 10 is to run, and a moment when this vehicle 10 is to run this location. Then, the judgment unit 525 acquires shape information about the vehicle 10 of the type identified using the vehicle type identification information. In this regard, a projection area of each vehicle 10 viewed from an image capturing direction of the image capturing device 90, namely, an area occupied by each vehicle 10 in a captured image Im1 has correlation with an appearance shape of the vehicle 10. When the sensor information is acquired, a larger vehicle class results in a higher probability of an overlap of two or more vehicles 10 in the sensor information while a smaller vehicle class results in a lower probability of an overlap of two or more vehicles 10 in the sensor information, for example. For this reason, in judging whether the second case applies, the judgment unit 525 uses a difference in appearance shape responsive to the types of the vehicles 10. More specifically, the judgment unit 525 judges that the second case applies if any of total values about the respective vehicles 10 each including a total length, a vehicle width, and a vehicle height is equal to or greater than a predetermined vehicle class threshold, for example. Meanwhile, if all the total values about the respective vehicles 10 each including a total length, a vehicle width, and a vehicle height is less than the vehicle class threshold, the judgment unit 525 judges that the second case does not apply.

The judgment unit 525 may judge whether the second case applies by a method different from the method described above. For example, if an integrated value corresponding to a sum of total values about the respective vehicles 10 each including a total length, a vehicle width, and a vehicle height is equal to or greater than a predetermined integrated value threshold, the judgment unit 525 may judge that the second case applies. In this case, if the integrated value is less than the integrated value threshold, the judgment unit 525 judges that the second case does not apply. By doing so, it also becomes possible to judge whether the second case applies. The judgment unit 525 may also judge whether the second case applies using information about the image capturing device 90 such as the detection range RG, a location of installation, an installation angle, etc. of the image capturing device 90 in addition to the above-mentioned information, for example. By doing so, it becomes possible to more correctly judge whether the second case applies.

The judgment unit 525 may identify the type of each of the two or more vehicles 10 expected to be included in the sensor information by a method different from the above-described method. For example, the judgment unit 525 may identify the type of each of the two or more vehicles 10 expected to be included in the sensor information using sensor information already acquired by the external sensor 9 located behind a subject sensor in a traveling direction of the vehicle 10. The subject sensor is the external sensor 9 scheduled to acquire sensor information to be subjected to a judgment as to whether the second case applies. By doing so, it becomes possible to identify the type of the vehicle 10 using sensor information in the past including the two or more vehicles 10 expected to be included in the sensor information to be subjected to a judgment as to whether the second case applies. The judgment unit 525 in the CPU 52 is not an essential function. The control value generation unit 526 may determine whether at least either one of the first case and the second case applies by accepting input from a user through an input operation unit, for example.

The control value generation unit 526 generates a control value as a running control signal for defining running motion of at least one of a plurality of the vehicles 10 using the sensor information. If at least either one of the first case and the second case applies, the control value generation unit 526 generates a retreat control value in order to establish a locational relationship allowing the detection subject vehicle 10a of two or more vehicles 10 to be detected by the detection unit 522d without causing an overlap of the detection subject vehicle 10a with a different one of a plurality of the vehicles 10 other than the detection subject vehicle 10a. The retreat control value is a control value for defining running motion of at least any of two or more vehicles 10 in order to establish a locational relationship allowing the detection subject vehicle 10a to be detected by the detection unit 522d without causing an overlap of the detection subject vehicle 10a with the different vehicle 10. In other words, the retreat control value is a control value for causing the external sensor 9 to acquire sensor information in a state where the detection subject vehicle 10a does not overlap the different vehicle 10. In the present embodiment, the control value generation unit 526 determines whether at least either one of the first case and the second case applies on the basis of result of the judgment by the judgment unit 525.

The retreat control value in the first case is a control value for defining running motion of at least one of the first vehicle 101 and the second vehicle 102 in order for the actual distance L1 between the first vehicle 101 and the second vehicle 102 overlapping each other in the sensor information to become a target distance L2 longer than the actual distance L1 at a moment when the first case is judged to apply. The retreat control value in the second case is a control value for defining running motion of at least one of the first vehicle 101 and the second vehicle 102 in order for the actual distance L1 between the first vehicle 101 and the second vehicle 102 expected to overlap each other in the sensor information when the sensor information is acquired to become the target distance L2 longer than the actual distance L1 at a moment when the second case is judged to apply.

The target distance L2 is set in response to the actual distance L1 between the first vehicle 101 and the second vehicle 102 overlapping each other or expected to overlap each other in the sensor information, an appearance shape of the first vehicle 101, and an appearance shape of the second vehicle 102, for example. As the appearance shape of the first vehicle 101 and the appearance shape of the second vehicle 102 become larger, the target distance L2 becomes longer. Meanwhile, as the appearance shape of the first vehicle 101 and the appearance shape of the second vehicle 102 become smaller, the target distance L2 becomes shorter. While the target distance L2 is set by the control value generation unit 526 in a case described below, the target distance L2 may be set by a unit other than the control value generation unit 526. The control value generation unit 526 may recognize the target distance L2 set by a user by accepting input from the user through the input operation unit, for example.

FIG. 4A is a view showing an example of a method of setting the target distance L2. In FIG. 4A, the first vehicle 101 and the second vehicle 102 are the vehicles 10 overlapping each other in the sensor information or expected to overlap each other when the sensor information is acquired. The control value generation unit 526 sets the target distance L2 using the actual distance L1 between the first vehicle 101 and the second vehicle 102, the camera database D1, and the vehicle type database D2.

The control value generation unit 526 acquires a coordinate value indicating the location of the image capturing device 90 in a global coordinate system as information indicating a location of installation of the image capturing device 90 as a source of acquisition of the captured image Im1. Furthermore, if the first case applies, the control value generation unit 526 acquires the height H of the image capturing device 90 as a source of acquisition of the captured image Im1 from the road surface 60 by referring to the camera database D1. The control value generation unit 526 acquires the height H of the image capturing device 90 as a source of acquisition of the captured image Im1 from the road surface 60 by acquiring an image capturing parameter from the camera database D1 associated with camera identification information having been transmitted together with the captured image Im1, for example. If the second case applies, regarding the image capturing device 90 scheduled to acquire the sensor information where the first vehicle 101 and the second vehicle 102 are expected to overlap each other, the control value generation unit 526 acquires the height H of this image capturing device 90 from the road surface 60. Furthermore, the control value generation unit 526 acquires a height hg of a rear end of the first vehicle 101 on a ceiling side (hereinafter called an upper rear end 10g) running ahead of the second vehicle 102 in a traveling direction from the road surface 60.

Next, the control value generation unit 526 calculates the location of the upper rear end 10g of the first vehicle 101 using the locations of the upper rear end 10g and the positioning point 10e of the first vehicle 101 relative to each other and using the location of the positioning point 10e of the first vehicle 101, for example. At this time, the control value generation unit 526 uses the location of the first vehicle 101 calculated by a location calculating method shown in FIGS. 5 to 10 described later as the location of the positioning point 10e of the first vehicle 101, for example. The control value generation unit 526 may use an estimated location of the first vehicle 101 estimated using a running speed and a running duration of the first vehicle 101 as the location of the positioning point 10e of the first vehicle 101.

Next, the control value generation unit 526 calculates a required distance L3 using a homothetic relationship between the height H of the image capturing device 90 from the road surface 60 and the height hg of the upper rear end 10g of the first vehicle 101 from the road surface 60. The required distance L3 is a minimum inter-vehicular distance between the first vehicle 101 and the second vehicle 102 required for establishing a locational relationship allowing the detection subject vehicle 10a to be detected by the detection unit 522d without causing an overlap of the detection subject vehicle 10a with the different vehicle 10. To calculate the required distance L3 using the homothetic relationship between the height H of the image capturing device 90 from the road surface 60 and the height hg of the upper rear end 10g of the first vehicle 101 from the road surface 60, the control value generation unit 526 performs the following process, for example. The control value generation unit 526 calculates a spacing distance Lt between a first intersection point Q1 that is an intersection point of a first normal J1 and the road surface 60 and a second intersection point Q2 that is an intersection point of a second normal J2 and the road surface 60, which is a spacing distance Lt between along a traveling direction of the first vehicle 101. The first normal J1 is a normal extending from a front end 10i of the vehicle 10 toward the road surface 60. The second normal J2 is a normal extending from the image capturing device 90 toward the road surface 60. Furthermore, the control value generation unit 526 acquires a total length Lf of the vehicle 10 approximate to a spacing distance between the first intersection point Q1 and a third intersection point Q3. The third intersection point Q3 is an intersection point of a third normal J3 and the road surface 60. The third normal J3 is a normal extending from the upper rear end 10g of the vehicle 10 toward the road surface 60. At this time, as indicated by the following formula (1), a homothetic ratio between the height hg of the upper rear end 10g of the vehicle 10 from the road surface 60 and the height H of the image capturing device 90 from the road surface 60 is equal to a homothetic ratio between the required distance L3 and a total distance Lp determined by adding the spacing distance Lt between the first intersection point Q1 and the second intersection point Q2 and the total length Lf of the vehicle 10 to the required distance L3.

$$hg:H = L3:Lp = L3:(Lt + Lf + L3) \quad \text{formula (1)}$$

The control value generation unit 526 calculates the required distance L3 by substituting each of the calculated or acquired values into this formula (1).

Next, the control value generation unit 526 acquires the actual distance L1 between the first vehicle 101 and the second vehicle 102. If the actual distance L1 between the first vehicle 101 and the second vehicle 102 is equal to or less than the required distance L3, the control value generation unit 526 sets the calculated required distance L3 to the target distance L2, for example, thereby generating a retreat control value. Meanwhile, if the actual distance L1 between the first vehicle 101 and the second vehicle 102 is greater than the required distance L3, the control value generation unit 526 sets an arbitrary distance equal to or greater than the actual distance L1 to the target distance L2, for example. By doing so, it becomes possible to set the suitable target distance L2 in response to a situation of running of the vehicle 10. If the actual distance L1 between the first vehicle 101 and the second vehicle 102 is greater than the required distance L3, the control value generation unit 526 may set an arbitrary distance greater than the actual distance L1 to the target distance L2. By doing so, it becomes possible to further reduce a likelihood that the first vehicle 101 and the second vehicle 102 will overlap each other in the sensor information.

A method of setting the target distance L2 is not limited to the above. For example, the control value generation unit 526 may set the target distance L2 using information about the image capturing device 90 as a source of acquisition of the captured image Im1 such as the detection range RG, a location of installation, and an installation angle of the image capturing device 90. By doing so, it becomes possible to set the more suitable target distance L2.

For example, the retreat control value includes a rudder angle control value for defining a rudder angle of the control subject vehicle 10b. Thus, moving either one of the first vehicle 101 and the second vehicle 102 in a width direction of the track 6 allows the actual distance L1 between the first vehicle 101 and the second vehicle 102 to be changed to the target distance L2. Moving the vehicle 10 in the width direction of the track 6 is either moving the vehicle 10 to at least one of a shoulder and a frontage road provided along the sides of the track 6 or moving the vehicle 10 to a different lane next to a lane along which the vehicle 10 is running. By doing so, it becomes possible to prevent the different vehicle 10 other than the detection subject vehicle 10a from becoming a hindrance during detection of the detection subject vehicle 10a. It further becomes possible to correct locational deviations of the first vehicle 101 and the second vehicle 102 from respective target running routes during a course of changing the actual distance L1 between the first vehicle 101 and the second vehicle 102 to the target distance L2 while the first vehicle 101 and the second vehicle 102 run along the respective target running routes.

If the second vehicle 102 runs behind the first vehicle 101 in the same forward traveling direction as the first vehicle 101, the retreat control value may further include a control value as follows. In this case, the retreat control value may include an acceleration control value for defining an acceleration of the control subject vehicle 10b. In this case, by causing the second vehicle 102 to pass the first vehicle 101, it becomes possible to change the actual distance L1 between the first vehicle 101 and the second vehicle 102 to the target distance L2. By doing so, if the first vehicle 101 running ahead is intended to become the detection subject vehicle 10a, causing the second vehicle 102 running behind to pass the first vehicle 101 makes it possible to prevent the second vehicle 102 from becoming a hindrance during detection of the first vehicle 101, for example. It further becomes possible to adjust a moving speed of moving of either one of the first vehicle 101 and the second vehicle 102 in the width direction of the track 6.

The retreat control value may include a control value as follows instead of the above-described control value, for example. In this case, the retreat control value may include at least any of an acceleration control value for increasing an acceleration of the first vehicle 101 in a forward traveling direction, an acceleration control value for reducing an acceleration of the second vehicle 102 in the forward traveling direction, a direction control value for moving the second vehicle 102 backward in a direction opposite the forward traveling direction, and a stop control value for stopping running motion of the second vehicle 102, for example. By doing so, it becomes possible to make a distance between the first vehicle 101 and the second vehicle 102 in a direction conforming to the forward traveling direction larger than a corresponding distance at a moment when at least either one of the first case and the second case applies. This allows the actual distance L1 between the first vehicle 101 and the second vehicle 102 to be changed to the target distance L2. As a result, it becomes possible to prevent the different vehicle 10 other than the detection subject vehicle 10a from becoming a hindrance during detection of the detection subject vehicle 10a.

The types of the control values included in the retreat control value as a running control signal are not limited to the above. The retreat control value may be a control value including either one of a destination control value and an orbit control value, for example, instead of the acceleration control value, the rudder angle control value, the direction control value, and the stop control value. The destination control value is a control value for defining the location of the control subject vehicle 10b at a moment when control using the retreat control value is finished. Thus, the destination control value includes a target arrival time and a target arrival place of the control subject vehicle 10b. Generating the retreat control value including the destination control value allows the control subject vehicle 10b to be moved to the target arrival place at an intended time without defining running motion in detail in terms of an acceleration, a rudder angle, etc. The orbit control value is a control value for defining a running path by arranging predetermined time-based target running locations of the control subject vehicle 10b in chronological order. Generating the retreat control value including the orbit control value makes it possible to define a running path of the control subject vehicle 10b without defining running motion in detail in terms of an acceleration, a rudder angle, etc.

The control value generation unit 526 may generate a control value as a running control signal other than the retreat control value. For example, the control value generation unit 526 may generate a reference control value and a correction control value. The reference control value is a control value for causing the vehicle 10 to run along a predetermined target running route. The correction control value is a control value for correcting the location of the vehicle 10 relative to the target running route. If the vehicle controller 150 receives either one of the reference control value and the correction control value and controls motion of the vehicle 10 in response to the received control value, the control value generation unit 526 may generate the retreat control value as a control value as an alternative to the reference control value and the correction control value. By doing so, if the vehicle 10 runs on the basis of a control value other than the retreat control value at a moment when at least either one of the first case and the second case applies, it becomes possible to change motion of the running vehicle 10 to running motion responsive to the retreat control value.

The transmission unit 527 shown in FIG. 3 transmits various types of information. For example, the transmission unit 527 transmits a control value generated by the control value generation unit 526 to the control subject vehicle 10b. The configuration of the CPU 52 is not limited to the above. At least some of the functions of the CPU 52 may be realized as one function of the vehicle controller 150 or that of the image capturing device 90.

FIG. 4B is a flowchart showing a processing procedure for running control of the vehicle 10 in the first embodiment. In step S901, the server 5 acquires vehicle location information using detection result output from an external sensor. The external sensor is located outside the vehicle 10. The vehicle location information is locational information as a basis for generating a running control signal. In the present embodiment, the vehicle location information includes the location and orientation of the vehicle 10 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S91, the server 5 acquires the vehicle location information using the captured image acquired from the camera as the external sensor.

More specifically, in step S901, the server 5 for example, determines the outer shape of the vehicle 10 from the captured image, calculates the coordinates of a positioning point of the vehicle 10 in a coordinate system of the captured image, namely, in a local coordinate system, and converts the calculated coordinates to coordinates in the global coordinate system, thereby acquiring the location of the vehicle 10. The outer shape of the vehicle 10 in the captured image may be detected by inputting the captured image to a detection model using artificial intelligence, for example. The detection model is prepared in the system 1 or outside the system 1. The detection model is stored in advance in a memory of the server 5, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 10, and a label showing whether each region in the training image is a region indicating the vehicle 10 or a region indicating a subject other than the vehicle 10, for example. In training the CNN, a parameter for the CNN is preferably updated through backpropagation in such a manner as to reduce error between output result obtained by the detection model and the label. The server 5 can acquire the orientation of the vehicle 10 through estimation based on the direction of a motion vector of the vehicle 10 detected from change in location of a feature point of the vehicle 10 between frames of the captured images using optical flow process, for example.

In step S902, the server 5 determines a target location to which the vehicle 10 is to move next. In the present embodiment, the target location is expressed by X, Y, and Z coordinates in the global coordinate system. The memory of the server 5 contains a reference route stored in advance as a route along which the vehicle 10 is to run. The route is expressed by a node indicating a departure place, a node indicating a way point, a node indicating a destination, and a link connecting nodes to each other. The server 5 determines the target location to which the vehicle 10 is to move next using the vehicle location information and the reference route. The server 5 determines the target location on the reference route ahead of a current location of the vehicle 10.

In step S903, the server 5 generates a running control signal for causing the vehicle 10 to run toward the determined target location. In the present embodiment, the running control signal includes an acceleration and a steering angle of the vehicle 10 as parameters. The server 5 calculates a running speed of the vehicle 10 from transition of the location of the vehicle 10 and makes comparison between the calculated running speed and a target speed of the vehicle 10 determined in advance. If the running speed is lower than the target speed, the server 5 generally determines an acceleration in such a manner as to accelerate the vehicle 10. If the running speed is higher than the target speed as, the server 5 generally determines an acceleration in such a manner as to decelerate the vehicle 10. If the vehicle 10 is on the reference route, server 5 determines a steering angle and an acceleration in such a manner as to prevent the vehicle 10 from deviating from the reference route. If the vehicle 10 is not on the reference route, in other words, if the vehicle 10 deviates from the reference route, the server 5 determines a steering angle and an acceleration in such a manner as to return the vehicle 10 to the reference route. In other embodiments, the running control signal may include the speed of the vehicle 10 as a parameter instead of or in addition to the acceleration of the vehicle 10.

In step S904, the server 5 transmits the generated running control signal to the vehicle 10. The server 5 repeats the acquisition of vehicle location information, the determination of a target location, the generation of a running control signal, the transmission of the running control signal, and others in a predetermined cycle.

In step S905, the driving controller of the vehicle 10 receives the running control signal transmitted from the server 5. In step S906, the vehicle 10 controls an actuator of the vehicle 10 using the received running control signal, thereby causing the vehicle 10 to run at the acceleration and the steering angle indicated by the running control signal. The vehicle 10 repeats the reception of a running control signal and the control over the actuator in a predetermined cycle. According to the system 1 in the present embodiment, it becomes possible to move the vehicle 10 without using a transport unit such as a crane or a conveyor.

A-2. Method of Calculating Location of Detection Subject Vehicle

FIG. 5 is a flowchart showing an example of a method of calculating the location of the detection subject vehicle 10a using one captured image acquired by one image capturing device 90. The method shown in FIG. 5 is implemented repeatedly at a predetermined time interval after a moment when the detection subject vehicle 10a starts running in the remote automatic driving mode, for example. Described first by referring to each of FIG. 5 and subsequent drawings to FIG. 10 referred to later is a method of calculating the location of the detection subject vehicle 10a if none of the first case and the second case applies. In the location calculating method shown in FIG. 5 and the subsequent drawings to FIG. 10 referred to later, the second vehicle 102 corresponds to the detection subject vehicle 10a. The first vehicle 101 corresponds to the exception vehicle 10f. In the illustration in FIG. 6, the first vehicle 101 is present beyond a recognition subject region and is judged to be the exception vehicle 10f accordingly.

FIG. 6 is a schematic view showing examples of various types of images resulting from implementation of the location calculating method shown in FIG. 5. FIG. 6 shows step numbers corresponding to those shown in FIG. 5. The location calculating method shown in FIGS. 5 to 10 will be described in an exemplary case where the first vehicle 101 and the second vehicle 102 move (run) in the same traveling direction on the road surface 60 given the grid lines 61 in a mesh pattern drawn along an Xg axis parallel to the traveling direction of the first vehicle 101 and the second vehicle 102 and along a Yg axis perpendicular to the Xg axis. Each of the Xg axis and the Yg axis is a coordinate axis in a global coordinate system. The grid lines 61 are omissible in other embodiments.

As shown in FIG. 5, in the location calculating method, an image acquiring step (step S1) is performed first. As shown in FIG. 6, the image acquiring step is a step of acquiring the captured image Im1 including the detection subject vehicle 10a. In the image acquiring step, the acquisition unit 521 acquires the captured image Im1 captured by the image capturing device 90.

As shown in FIG. 5, a location calculating step is performed subsequently to the image acquiring step. The location calculating step is a step of calculating a local coordinate point about the detection subject vehicle 10a using the captured image Im1 acquired in the image acquiring step.

In the location calculating step, a distortion correcting step (step S2) is performed first. As shown in FIG. 6, the distortion correcting step is a step of correcting distortion in the captured image Im1. In the distortion correcting step, the distortion correction unit 522a corrects distortion in the captured image Im1 to generate a corrected image Im2. More specifically, the distortion correction unit 522a corrects the distortion in the captured image Im1 using the distortion correction parameter Pa1 stored in advance in the storage unit 53, for example. The distortion correction parameter Pa1 is a parameter relating to location information about the grid lines 61 obtained through calibration, for example. A method of correcting the distortion is not limited to the above. The distortion correction parameter Pa1 may be any parameter other than that described above.

As shown in FIG. 5, a rotation processing step (step S3) is performed subsequently to the distortion correcting step. As shown in FIG. 6, the rotation processing step is a step of rotating the corrected image Im2 in such a manner that a moving vector of the detection subject vehicle 10a included in the corrected image Im2 is pointed in a predetermined direction. In the rotation processing step, the rotation processing unit 522b rotates the corrected image Im2 in such a manner that the moving vector of the detection subject vehicle 10a included in the corrected image Im2 is pointed in the predetermined direction. By doing so, the rotation processing unit 522b generates a rotated image Im3. More specifically, the rotation processing unit 522b rotates the corrected image Im2 about a barycenter of the detection subject vehicle 10a in the corrected image Im2 as a rotation center in such a manner that the direction of the moving vector of the detection subject vehicle 10a is pointed upward on a screen of a display device on which the corrected image Im2 is displayed, for example. Motion of a feature point of the detection subject vehicle 10a (the barycenter thereof, for example) may be expressed as a direction of the moving vector using an optical flow method, for example. The quantity of the moving vector and the direction of the moving vector of the detection subject vehicle 10a are estimated on the basis of change in the location of a feature point set properly in the corrected image Im2 between image frames, for example. A method of the rotation processing is not limited to the above.

As shown in FIG. 5, a trimming step (step S4) is performed subsequently to the rotation processing step. As shown in FIG. 6, the trimming step is a step of generating a processed image Im4 including a necessary region from the rotated image Im3. In the present embodiment, if the detection subject vehicle 10a has moved a distance exceeding a predetermined threshold, the trimming unit 522c trims a moved region A2 as an unnecessary region responsive to the distance of moving of the detection subject vehicle 10a from the rotated image Im3 in the trimming step. By doing so, the trimming unit 522c generates the processed image Im4 including an unmoved region A1 including the detection subject vehicle 10a as a necessary region cut out from the rotated image Im3. At this time, using the estimated quantity of the moving vector of the detection subject vehicle 10a, for example, the trimming unit 522c determines the distance the detection subject vehicle 10a has moved, thereby estimating the moved region A2. In the location calculating step, either the rotation processing step or the trimming step may be performed previously to the other. A method of the trimming is not limited to the above.

As shown in FIG. 5, a detecting step (step S5) is performed subsequently to the trimming step. As shown in FIG. 6, the detecting step is a step of detecting an outer shape (contour) of the vehicle 10 included in the processed image Im4 using the location detection model Md. In the detecting step, the detection unit 522d inputs the processed image Im4 to the location detection model Md. By doing so, the detection unit 522d detects the first vehicle 101 and the second vehicle 102 as the detection subject vehicle 10a included in the processed image Im4. Then, the detection unit 522d masks the first vehicle 101 in the processed image Im4 to add a first mask region M1 and masks the second vehicle 102 in the processed image Im4 to add a second mask region M2, thereby generating a first mask image Im5. A method of detecting the outer shape of the vehicle 10 is not limited to the above.

As shown in FIG. 5, a deleting step (step S6) is performed subsequently to the detecting step. As shown in FIG. 6, the deleting step is a step of deleting the mask region M1 of the exception vehicle 10f as the different vehicle 10 other than the detection subject vehicle 10a from the first mask image Im5. In the illustration in FIG. 6, the deletion unit 522e deletes the first mask region M1 from the first mask image Im5 in the deleting step. By doing so, the deletion unit 522e generates a first mask image Im6 including only the mask region M2 of the detection subject vehicle 10a. In the following, the first mask image Im6 resulting from deletion of the mask region M1 of the vehicle 10 other than the detection subject vehicle 10a, namely, the first mask image Im6 including only the mask region M2 of the detection subject vehicle 10a will be called a "first mask image Im6." A method of the deletion is not limited to the above. The deleting step is omitted if the location of each of two or more vehicles 10 included in the captured image Im1 is to be calculated while the captured image Im1 includes only one vehicle 10 and none of the first case and the second case applies. In the following, the first mask image Im6 resulting from implementation of the deleting step means the first mask image Im6 generated by the deleting step, namely, means the first mask image Im6 resulting from deletion of the mask region M1 of the vehicle 10 other than the detection subject vehicle 10a. The first mask image Im5 without subjected to the deleting step means the first mask image Im5 generated by the detecting step.

As shown in FIG. 5, a perspective transforming step (step S7) is performed subsequently to the deleting step. As shown in FIG. 6, the perspective transforming step is a step of perspective transforming the first mask image Im6. In the perspective transforming step, the perspective transformation unit 522f generates a second mask image Im7 by perspective transforming the first mask image Im6. More specifically, the perspective transformation unit 522f perspective transforms the first mask image Im6 into an overhead image taken in a view from above the detection subject vehicle 10a (for example, from directly above the detection subject vehicle 10a) and substantially vertical to the road surface 60 using the predetermined perspective transformation parameter Pa2 stored in the storage unit 53, for example. The perspective transformation parameter Pa2 is a parameter relating to location information and an internal parameter about the image capturing device 90 obtained through calibration, for example. In this way, the perspective transformation unit 522f generates the second mask image Im7 expressed in a local coordinate system from the first mask image Im6 expressed in a camera coordinate system. The local coordinate system is a coordinate system having an origin defined by one point on an image plane projected by the perspective transformation, and coordinate axes indicated by an Xi axis and a Yi axis perpendicular to the Xi axis. A method of the perspective transformation is not limited to the above. The perspective transformation parameter Pa2 may be any parameter other than that described above.

As shown in FIG. 5, a coordinate point calculating step (step S8) is performed subsequently to the perspective transforming step. FIG. 7 is a view for explaining details of the coordinate point calculating step. The coordinate point calculating step is a step of calculating a local coordinate point P3 about the detection subject vehicle 10a.

In the coordinate point calculating step, the coordinate point calculation unit 522g acquires a base coordinate point P0 from a first circumscribed rectangle R1 set at the mask region M2 in the first mask image Im6 as an image before the perspective transformation. FIG. 8 is a view for explaining a method of acquiring the base coordinate point P0. In order to acquire the base coordinate point P0, the coordinate point calculation unit 522g sets a base circumscribed rectangle R0 at the mask region M2 in the first mask image Im6. Next, the coordinate point calculation unit 522g rotates the first mask image Im6 to a required rotation amount about a barycenter C of the mask region M2 as a rotation center in such a manner that a direction of a moving vector V of the detection subject vehicle 10a corresponding to the mask region M2 in the first mask image Im6 is pointed in a predetermined direction. The predetermined direction is an upward direction on the screen of the display device, for example. Next, the coordinate point calculation unit 522g sets the first circumscribed rectangle R1 at the mask region M2 in the rotated first mask image Im6 in such a manner that the first circumscribed rectangle R1 has long sides parallel to the direction of the moving vector V. Next, the coordinate point calculation unit 522g rotates the first mask image Im6 including the added first circumscribed rectangle R1 reversely to the same rotation amount as above about the barycenter C of the mask region M2 as a rotation center. By doing so, the coordinate point calculation unit 522g acquires a coordinate point as the base coordinate point P0 about one vertex of the four vertexes of the first circumscribed rectangle R1, which is a vertex having a coordinate of the shortest distance to the positioning point 10e of the detection subject vehicle 10a. Then, as shown in FIG. 7, the coordinate point calculation unit 522g perspective transforms the reversely rotated first mask image Im6, namely, the first mask image Im6 where the base coordinate point P0 has been acquired. By doing so, the coordinate point calculation unit 522g acquires a first coordinate point P1 at the first circumscribed rectangle R1 transformed by the perspective transformation as a coordinate point corresponding to the base coordinate point P0.

Furthermore, the coordinate point calculation unit 522g sets a second circumscribed rectangle R2 at the mask region M2 in the second mask image Im7 resulting from the perspective transformation of the first mask image Im6. Then, the coordinate point calculation unit 522g acquires a vertex as a second coordinate point P2 indicating the same location as the first coordinate point P1, which is a vertex of the vertexes of the second circumscribed rectangle R2. More specifically, the coordinate point calculation unit 522g acquires a vertex as the second coordinate point P2 indicating one vertex of the four vertexes of the second circumscribed rectangle R2, which is a vertex having a coordinate of the shortest distance to the positioning point 10e of the detection subject vehicle 10a. Specifically, the first coordinate point P1 and the second coordinate point P2 are coordinate points indicating the same location, so that these coordinate points have correlation with each other.

Furthermore, the coordinate point calculation unit 522g makes a correction of replacing the coordinates (Xi1, Yi1) of the first coordinate point P1 with the coordinates (Xi2, Yi2) of the second coordinate point P2 in response to a magnitude relationship between a coordinate value of the first coordinate point P1 and a coordinate value of the second coordinate point P2. If the coordinate value Xi1 of the first coordinate point P1 in the Xi direction is larger than the coordinate value Xi2 of the second coordinate point P2 in the Xi direction (Xi1>Xi2), the coordinate point calculation unit 522g replaces the coordinate value Xi1 of the first coordinate point P1 in the Xi direction with the coordinate value Xi2 of the second coordinate point P2 in the Xi direction. If the coordinate value Yi1 of the first coordinate point P1 in the Yi direction is larger than the coordinate value Yi2 of the second coordinate point P2 in the Yi direction (Yi1>Yi2), the coordinate point calculation unit 522g replaces the coordinate value Yi1 of the first coordinate point P1 in the Yi direction with the coordinate value Yi2 of the second coordinate point P2 in the Yi direction. In the illustration in FIG. 7, the coordinate value Xi1 of the first coordinate point P1 in the Xi direction is larger than the coordinate value Xi2 of the second coordinate point P2 in the Xi direction. Furthermore, the coordinate value Yi1 of the first coordinate point P1 in the Yi direction is smaller than the coordinate value Yi2 of the second coordinate point P2 in the Yi direction. As a result, the local coordinate point P3 is given coordinates (Xi2, Yi1). In this way, the coordinate point calculation unit 522g corrects the first coordinate point P1 using the second coordinate point P2 to calculate the local coordinate point P3 indicating the location of the detection subject vehicle 10a in the local coordinate system. A method of calculating the local coordinate point P3 is not limited to the above.

Figure 9:
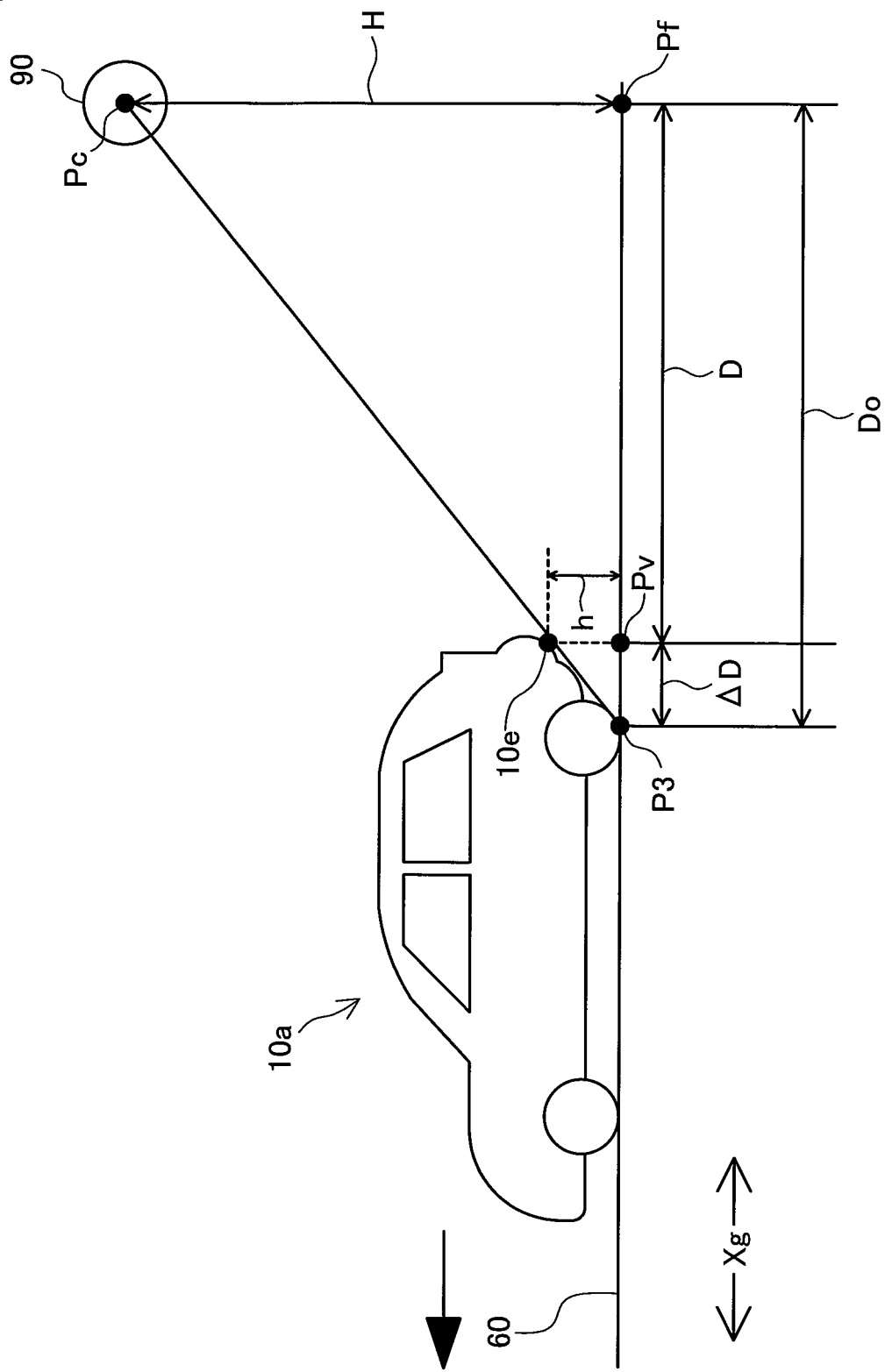
FIG. 9 is a first view for explaining details of a location converting step.

As shown in FIG. 5, a location converting step (step S9) is performed subsequently to the location calculating step. The location converting step is a step of calculating a vehicle coordinate point indicating the location of the detection subject vehicle 10a in the global coordinate system by converting the local coordinate point P3 to the vehicle coordinate point. In the location converting step, the location conversion unit 523 converts the local coordinate point P3 to the vehicle coordinate point using the image capturing parameter acquired by the acquisition unit 521 and a predetermined vehicle parameter. The vehicle parameter is a parameter relating to a distance from the road surface 60 to the positioning point 10e of the detection subject vehicle 10a. In the present embodiment, the vehicle parameter is a height h of the positioning point 10e of the detection subject vehicle 10a from the road surface 60 (FIG. 9 referred to later). The vehicle parameter may be a parameter relating to a distance to the positioning point 10e of the vehicle 10 of a predetermined type. Specifically, the vehicle parameter may be a variable responsive to the type of the vehicle 10 or may be a predetermined constant.

The location conversion unit 523 converts the local coordinate point P3 to the vehicle coordinate point using formulas (2) to (4) described later including the vehicle coordinate point as an objective variable and including the local coordinate point P3, the image capturing parameter, and the vehicle parameter as explanatory variables. In this case, the location conversion unit 523 substitutes the coordinate value of the local coordinate point P3 calculated by the location calculation unit 522 into relational expressions indicated by the formulas (2) to (4). The location conversion unit 523 substitutes a value of the image capturing parameter acquired by the acquisition unit 521, namely, a value of the image capturing parameter corresponding to the image capturing device 90 having acquired the captured image Im1 and a value of the vehicle parameter into the relational expressions indicated by the formulas (2) to (4).

Figure 10:
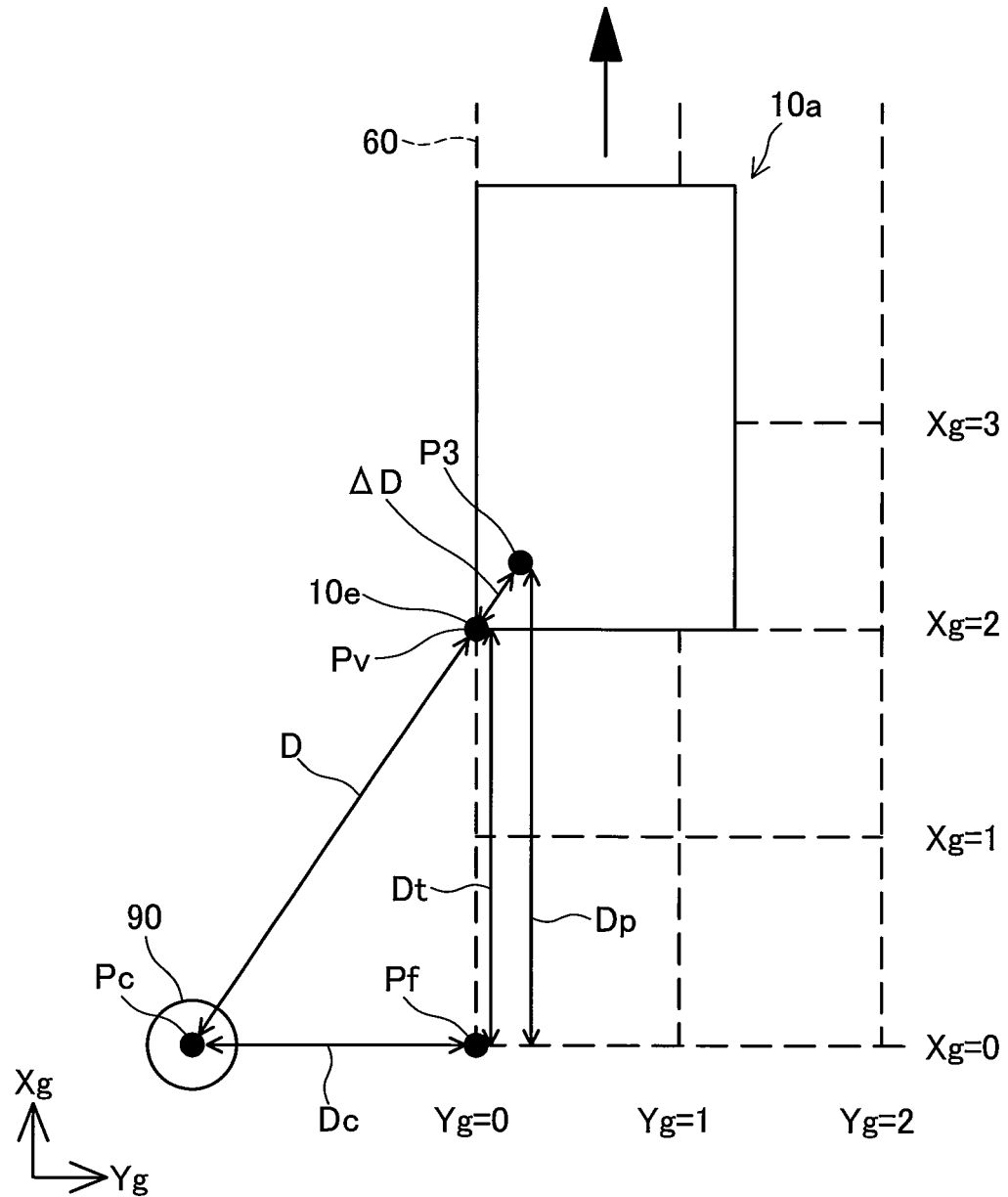
FIG. 10 is a second view for explaining details of the location converting step.

FIG. 9 is a first view for explaining details of the location converting step. FIG. 9 illustrates a state where the detection subject vehicle 10a is viewed from a left side. FIG. 10 is a second view for explaining details of the location converting step. FIG. 10 illustrates a state where the detection subject vehicle 10a is viewed from a roof side. A global coordinate system shown in each of FIGS. 9 and 10 is a coordinate system having an origin defined by a fixed coordinate point Pf indicating an arbitrary reference location on the road surface 60, and coordinate axes indicated by an Xg axis and a Yg axis perpendicular to the Xg axis. An image capturing coordinate point Pc is a coordinate point indicating the location of the image capturing device 90 having acquired the captured image Im1 used for the calculation of the local coordinate point P3, which is the location of the image capturing device 90 in the global coordinate system. The fixed coordinate point Pf and the image capturing coordinate point Pc are stored in advance in the storage unit 53.

As shown in FIG. 9, an observation distance on an XgYg plane between the location of the image capturing device 90 and the location of the detection subject vehicle 10a (local coordinate point P3) is defined as Do. Observation error is defined as ΔD. A height [m] of the image capturing device 90 from the road surface 60 as the image capturing parameter is defined as H. A height [m] of the positioning point 10e of the detection subject vehicle 10a from the road surface 60 as the vehicle parameter is defined as h. In this case, the observation error ΔD may be expressed by the following formula (2):

$$\Delta D = h/H \times Do \qquad \text{formula (2)}$$

Specifically, the observation error ΔD becomes larger as the observation distance Do becomes longer.

Next, with an actual distance between the location of the image capturing device 90 and the location of the positioning point 10e of the detection subject vehicle 10a (hereinafter called a first distance) defined as D, the first distance D may be expressed by the following formula (3):

$$D = Do \times (1 - h/H) \qquad \text{formula (3)}$$

Specifically, the first distance D is determined using the observation distance Do, the height H of the image capturing device 90 as the image capturing parameter, and the height h of the positioning point 10e of the detection subject vehicle 10a as the vehicle parameter.

Then, as shown in FIG. 10, with an estimated distance between the reference location and the location of the detection subject vehicle 10a defined as Dp and an actual distance between the reference location and the detection subject vehicle 10a (hereinafter called a second distance) defined as Dt, the second distance Dt may be expressed by the following formula (4):

$$Dt = Dp \times (1 - h/H) \qquad \text{formula (4)}$$

Here, it is possible to calculate the estimated distance Dp using an actual distance obtained from the fixed coordinate point Pf and the image capturing coordinate point Pc (hereinafter called a third distance Dc), the local coordinate point P3, and the fixed coordinate point Pf. This allows the location conversion unit 523 to calculate a vehicle coordinate point Pv using the second distance Dt obtained by correcting the estimated distance Dp by the foregoing formula (4) and using the fixed coordinate point Pf. The vehicle coordinate point Pv calculated at this time is a coordinate point indicating the location of the detection subject vehicle 10a in the global coordinate system, so that the vehicle coordinate point Pv corresponds to the location of the detection subject vehicle 10a in real space.

A-3. Remote Control Method

Figure 11:
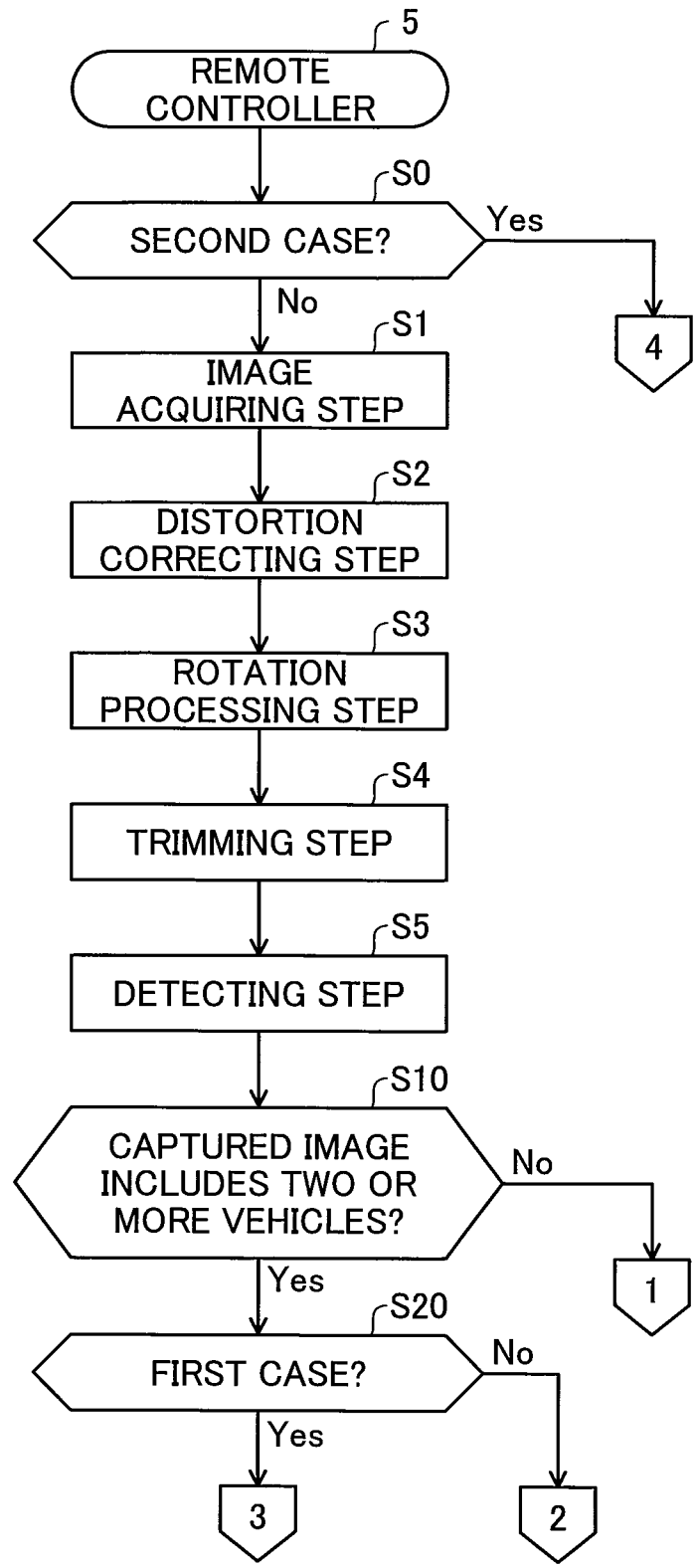
FIG. 11 is a first flowchart showing a remote control method according to the first embodiment.
Figure 12:
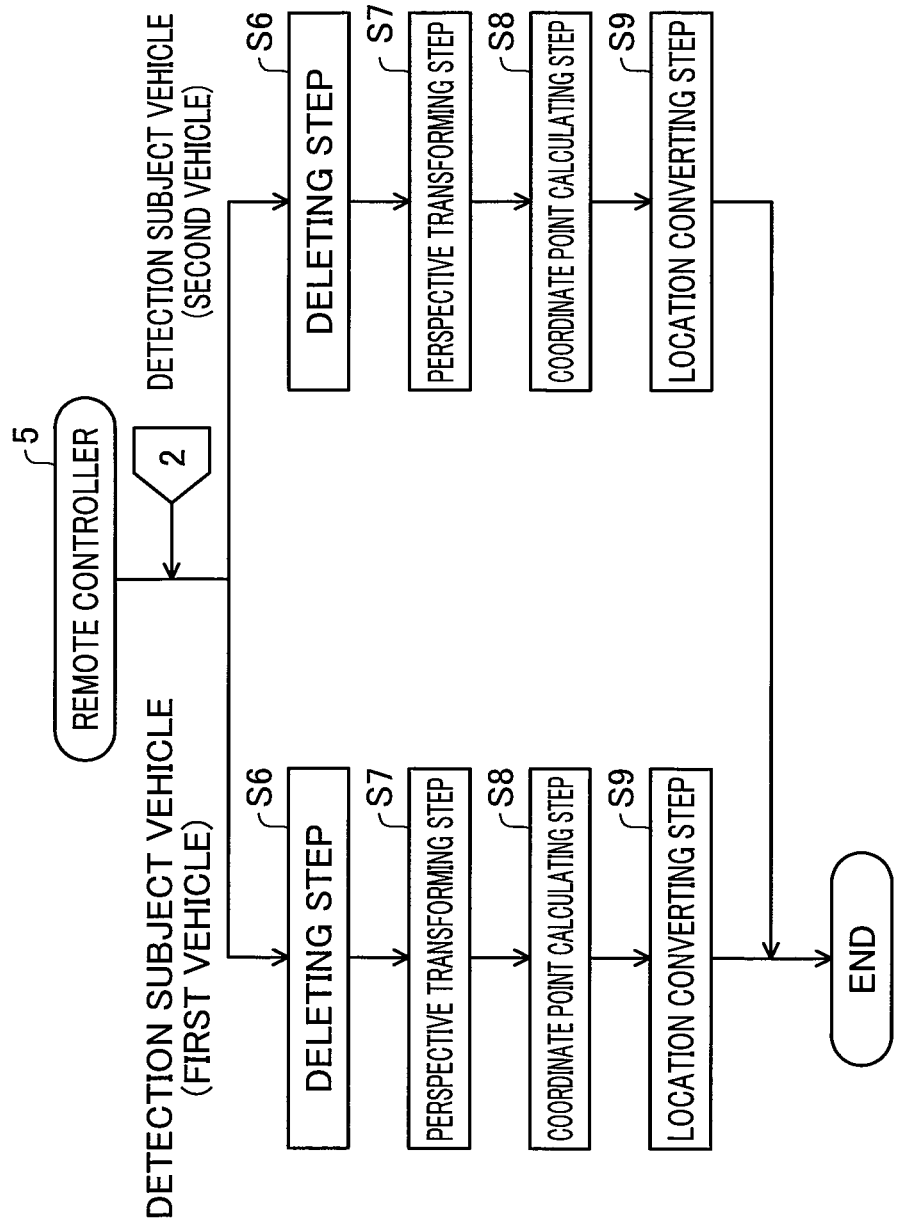
FIG. 12 is a second flowchart showing the remote control method according to the first embodiment.
Figure 13:
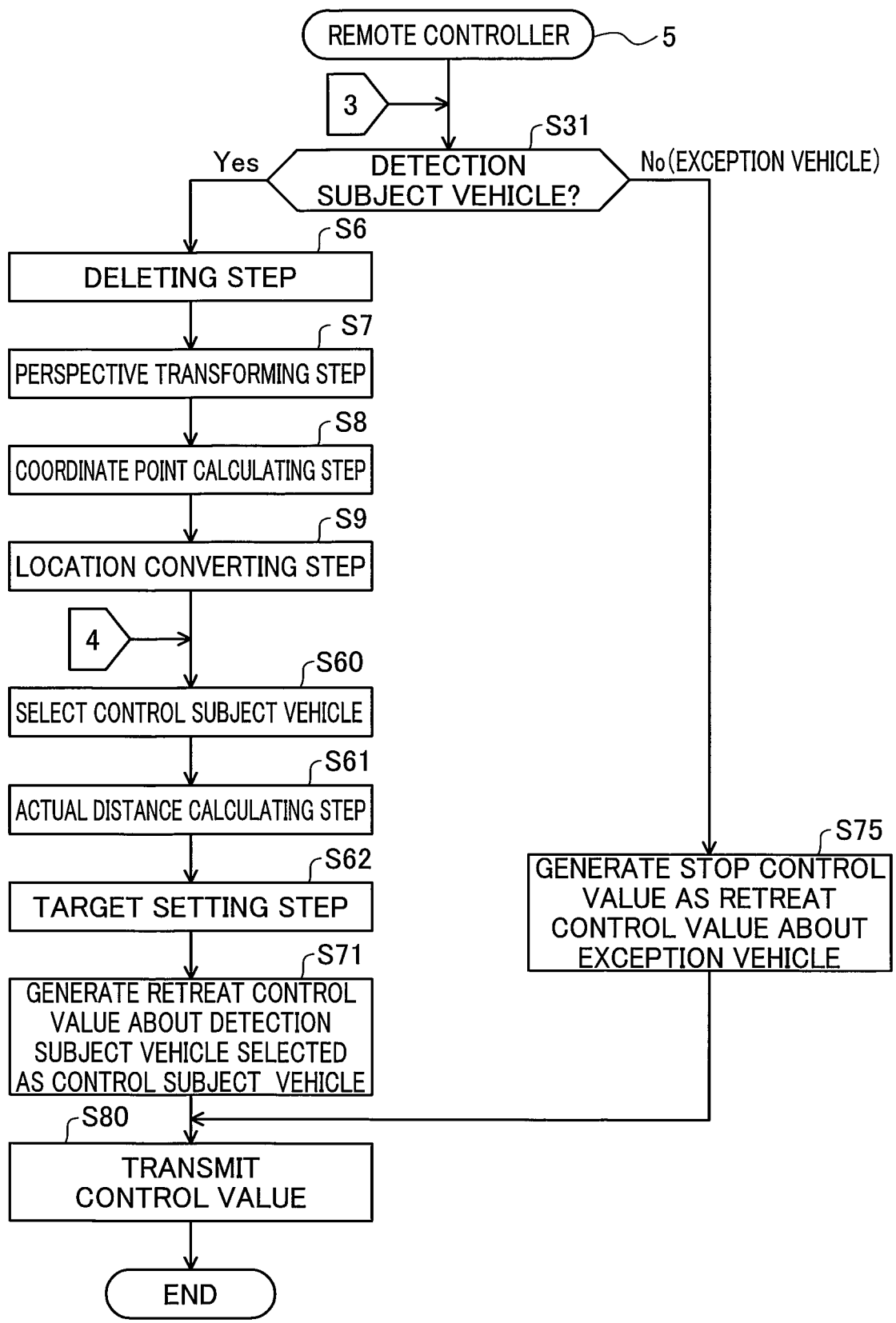
FIG. 13 is a third flowchart showing the remote control method according to the first embodiment.

FIG. 11 is a first flowchart showing a remote control method according to the first embodiment. FIG. 12 is a second flowchart showing the remote control method according to the first embodiment. FIG. 13 is a third flowchart showing the remote control method according to the first embodiment. The remote control method shown in FIGS. 11 to 13 is implemented repeatedly at a predetermined time interval after a moment when the vehicle 10 starts running in the remote automatic driving mode, for example. In FIGS. 11 to 13, steps same as corresponding steps in FIG. 5 are given the same signs and description of these steps will be omitted.

As shown in FIG. 11, the judgment unit 525 judges whether the second case applies (step S0). If the judgment unit 525 judges that the second case does not apply (step S0: No), the remote controller 5 performs the acquiring step, the distortion correcting step, the rotation processing step, the trimming step, and the detecting step sequentially in this order.

During a course of calculating the location of the vehicle 10, the judgment unit 525 judges using the first mask image Im5 as data generated by the detection unit 522d whether the captured image Im1 includes two or more vehicles 10 (step S10). If the judgment unit 525 judges that the captured image Im1 includes only one vehicle 10 (step S10: No), the remote controller 5 sets the vehicle 10 included in the captured image Im1 to the detection subject vehicle 10a. Then, the remote controller 5 performs the perspective transforming step, the coordinate point calculating step, and the location converting step in this order as shown in FIG. 5 to calculate the vehicle coordinate point Pv indicating the location of the detection subject vehicle 10a. The calculated vehicle coordinate point Pv is used for generating a control value such as a correction control value, for example.

As shown in FIG. 11, if the judgment unit 525 judges that the captured image Im1 includes two or more vehicles 10 (step S10: Yes), the judgment unit 525 judges whether the first case applies (step S20).

If the judgment unit 525 judges that the first case does not apply (step S20: No), the judgment unit 525 judges that each vehicle 10 included in the captured image Im1 is the detection subject vehicle 10a. Then, as shown in FIG. 12, the remote controller 5 performs the deleting step, the perspective transforming step, the coordinate point calculating step, and the location converting step in this order on each detection subject vehicle 10a. FIG. 12 shows a processing flow employed if the captured image Im1 includes the first vehicle 101 and the second vehicle 102. As a result, the remote controller 5 calculates the vehicle coordinate point Pv about each detection subject vehicle 10a indicating the location of each of the two or more vehicles 10 included in the captured image Im1. The calculated vehicle coordinate point Pv is used for generating a control value such as a correction control value, for example.

Meanwhile, as shown in FIG. 11, if the judgment unit 525 judges that the first case applies (step S20: Yes), the judgment unit 525 judges whether each of the two or more vehicles 10 included in the captured image Im1 is classified as the detection subject vehicle 10a or as the exception vehicle 10f (step S31), as shown in FIG. 13.

Figure 14:
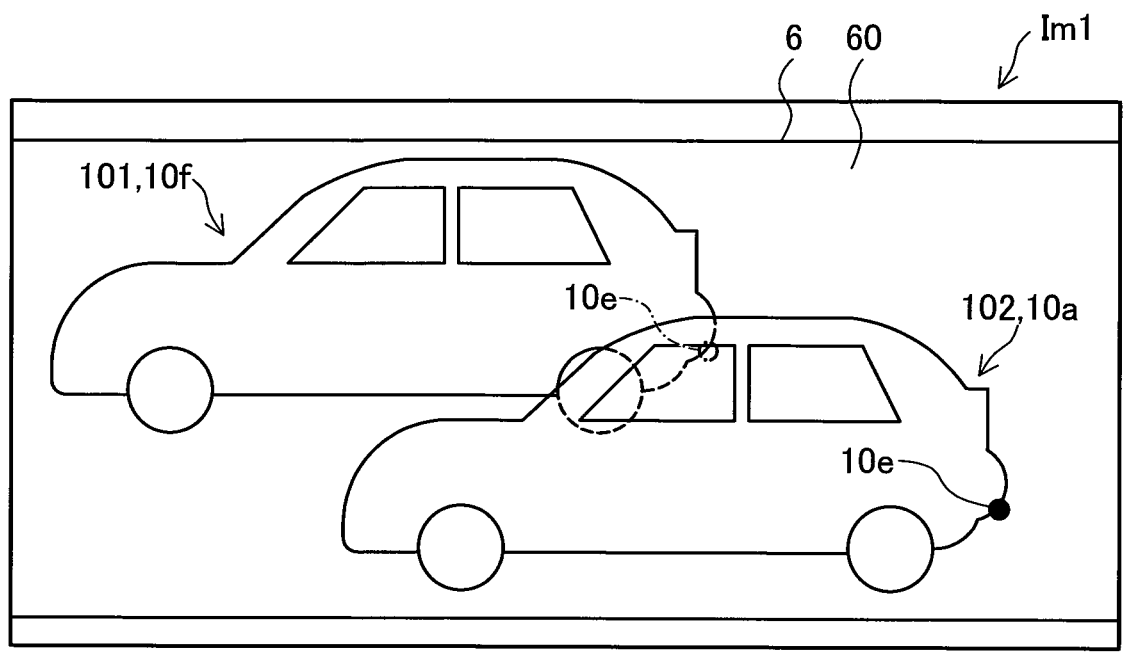
FIG. 14 is a view for explaining a judging method about classification of a vehicle.

FIG. 14 is a view for explaining an example of a judging method of judging whether the vehicle 10 is classified as the detection subject vehicle 10a or as the exception vehicle 10f. The judging method described next using FIG. 14 is employed in a case where both the first vehicle 101 and the second vehicle 102 exist in the recognition subject region. The illustration of the grid lines 61 is omitted from FIG. 14. In the case illustrated in FIG. 14, the second vehicle 102 overlaps the first vehicle 101 in such a manner as to cover the positioning point 10e of the first vehicle 101 in the captured image Im1. Specifically, in the captured image Im1, the first vehicle 101 is located at the back of the second vehicle 102. In this case, the judgment unit 525 judges whether each of the first vehicle 101 and the second vehicle 102 included in the captured image Im1 is classified as the detection subject vehicle 10a or as the exception vehicle 10f in response to whether the positioning point 10e is detectable in the captured image Im1. More specifically, the judgment unit 525 judges that the second vehicle 102 having the detectable positioning point 10e is the detection subject vehicle 10a. Meanwhile, the judgment unit 525 judges that the first vehicle 101 is the exception vehicle 10f having the positioning point 10e made undetectable by being overlapped with the different vehicle 10 in such a manner as to be covered at the positioning point 10e in the captured image Im1.

As shown in FIG. 13, the remote controller 5 generates a stop control value as the retreat control value about the exception vehicle 10f (step S75) without performing the deleting step, the perspective transforming step, the coordinate point calculating step, and the location converting step. The transmission unit 527 transmits the retreat control value as a control value (here, the stop control value) generated by the control value generation unit 526 to the vehicle 10 (here, the exception vehicle 10f) to be controlled (step S80).

Meanwhile, the remote controller 5 performs the deleting step, the perspective transforming step, the coordinate point calculating step, and the location converting step in this order on each detection subject vehicle 10a. By doing so, the remote controller 5 calculates the vehicle coordinate point Pv about each detection subject vehicle 10a indicating the location of the detection subject vehicle 10a of the two or more vehicles 10 included in the captured image Im1. Then, the judgment unit 525 selects the vehicle 10 to become the control subject vehicle 10b from the detection subject vehicle 10a (step S60). The actual distance calculation unit 524 calculates the actual distance L1 from the detection subject vehicle 10a selected as the control subject vehicle 10b by the judgment unit 525 to the vehicle 10 running without the presence of the different vehicle 10 between the selected detection subject vehicle 10a and the own vehicle 10 (step S61). The control value generation unit 526 sets the target distance L2 (step S62). Then, the control value generation unit 526 generates a retreat control value about the detection subject vehicle 10a (step S71) selected as the control subject vehicle 10b by the judgment unit 525. The transmission unit 527 transmits the retreat control value as a control value generated by the control value generation unit 526 to vehicle 10 (here, the control subject vehicle 10b) (step S80). If one vehicle 10 is judged to be the detection subject vehicle 10a while the first case applies, step S60 is omitted.

As shown in FIG. 11, if the judgment unit 525 judges that the second case applies (step S0: Yes), the judgment unit 525 judges that each vehicle 10 of two or more vehicles 10 expected to be included in the captured image Im1 is the detection subject vehicle 10a. Then, as shown in FIG. 13, the judgment unit 525 selects the vehicle 10 to become the control subject vehicle 10b from the detection subject vehicles 10a (step S60). Next, the control value generation unit 526 generates a retreat control value about the detection subject vehicle 10a (step S71) selected as the control subject vehicle 10b by the judgment unit 525. The transmission unit 527 transmits the retreat control value generated by the control value generation unit 526 to the control subject vehicle 10b (step S80). if the judgment unit 525 judges that the second case applies (step S0: Yes), steps S61 and S62 may or may not be performed in addition to step S60.

According to the above-described first embodiment, if at least either one of the first case and the second case applies, it is possible to generate a retreat control value in order to establish a locational relationship allowing the detection subject vehicle 10a of two or more vehicles 10 to be detected by the detection unit 522d without causing an overlap of the detection subject vehicle 10a with the different vehicle 10. It is possible to transmit the generated retreat control value to the control subject vehicle 10b. This allows reduction in a likelihood that two or more vehicles 10 will overlap each other in the captured image Im1 in tracking the location of the vehicle 10 using the captured image Im1 acquired by the image capturing device 90 installed at a place different from the vehicle 10. Thus, it is possible to track the location of the vehicle 10 more correctly using the captured image Im1.

According to the above-described first embodiment, it is possible to establish an expectation before acquisition of the captured image Im1 as sensor information whether two or more vehicles 10 overlap each other when the captured image Im1 is acquired. If it is expected that the two or more vehicles 10 overlap each other when the captured image Im1 is acquired, it is possible to generate a retreat control value and transmit the generated retreat control value to the control subject vehicle 10b. By doing so, it becomes possible to control running motion of the vehicle 10 before the occurrence of a situation where the two or more vehicles 10 overlap each other in the captured image Im1. This allows further reduction in a likelihood that two or more vehicles 10 will overlap each other in the captured image Im1 in tracking the location of the vehicle 10 using the captured image Im1. Thus, it is possible to reduce the occurrence of failing to track the location of the vehicle 10.

According to the above-described first embodiment, it is possible to calculate the actual distance L1 between the first vehicle 101 and the second vehicle 102 overlapping each other in the captured image Im1 or expected to overlap each other when the captured image Im1 is acquired. It is further possible to generate a retreat control value for defining running motion of at least one of the first vehicle 101 and the second vehicle 102 in order for the actual distance L1 between the first vehicle 101 and the second vehicle 102 to become the target distance L2 longer than the actual distance L1 at a moment when at least either one of the first case and the second case is judged to apply. This makes it possible to reduce a likelihood more reliably that the first vehicle 101 and the second vehicle 102 will overlap each other in the captured image Im1 in tracking the locations of the first vehicle 101 and the second vehicle 10 using the captured image Im1.

According to the above-described first embodiment, it is possible to set the target distance L2 in response to an appearance shape of the first vehicle 101 and an appearance shape of the second vehicle 102. This allows setting of the target distance L2 responsive to an appearance shape of the vehicle 10 having correlation with an area occupied by the vehicle 10 in the captured image Im1. By doing so, it becomes possible to make it unlikely that accuracy and probability of calculating the location of the vehicle 10 will be reduced depending on the type of the vehicle 10.

According to the above-described first embodiment, it is possible to generate a stop control value for stopping the vehicle 10 at a location incapable of being calculated as a result of an overlap of two or more vehicles 10 in the captured image Im1. This makes it possible to safely stop the vehicle 10 at a location incapable of being calculated.

According to the above-described first embodiment, it is possible to judge whether the second case applies in response to the type of each of two or more vehicles 10 expected to be included in the captured image Im1 when the captured image Im1 is acquired. By doing so, it becomes possible to more reliably judge whether the second case applies.

According to the above-described first embodiment, it is possible to judge whether the second case applies in response to an appearance shape of the vehicle 10 differing between the types of the vehicles 10, which is an appearance shape of each of two or more vehicles 10 expected to be included in the captured image Im1 when the captured image Im1 is acquired. This allows a judgment as to whether the second case applies in response to an appearance shape of the vehicle 10 having correlation with an area occupied by the vehicle 10 in the captured image Im1. This makes it possible to still more reliably judge whether the second case applies.

According to the above-described first embodiment, it is possible to judge whether each of two or more vehicles 10 included in the captured image Im1 is classified as the detection subject vehicle 10a or as the exception vehicle 10f in response to a locational relationship between the two or more vehicles 10 in the captured image Im1.

According to the above-described first embodiment, it is possible to set the vehicle 10 to the exception vehicle 10f having the positioning point 10e made undetectable by being overlapped with the different vehicle 10 in such a manner as to be covered at the positioning point 10e. Then, it is possible to omit the deleting step, the perspective transforming step, the coordinate point calculating step, and the location converting step for calculating the location of the exception vehicle 10f. By doing so, it becomes possible to reduce processing burden of the remote control method.

B. Second Embodiment

Figure 15:
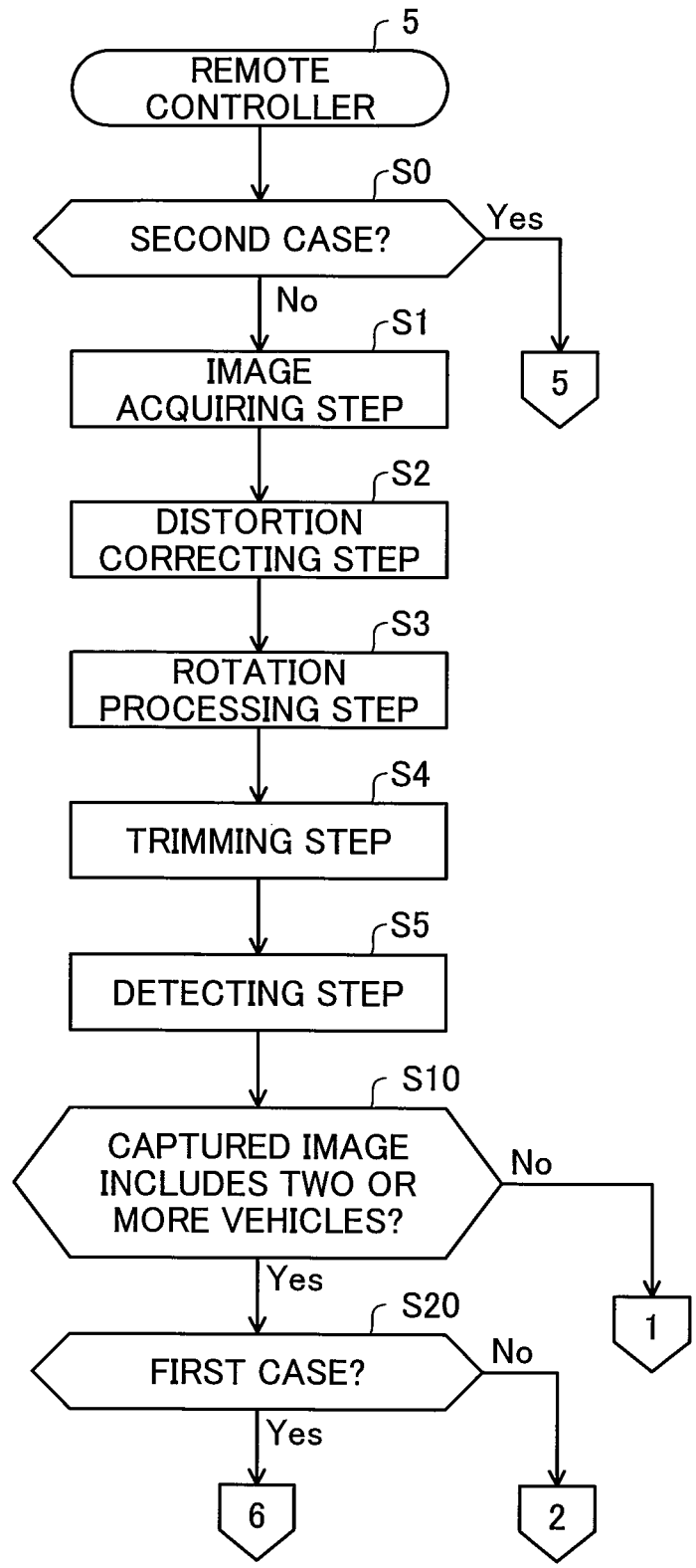
FIG. 15 is a first flowchart showing a remote control method according to a second embodiment.
Figure 16:
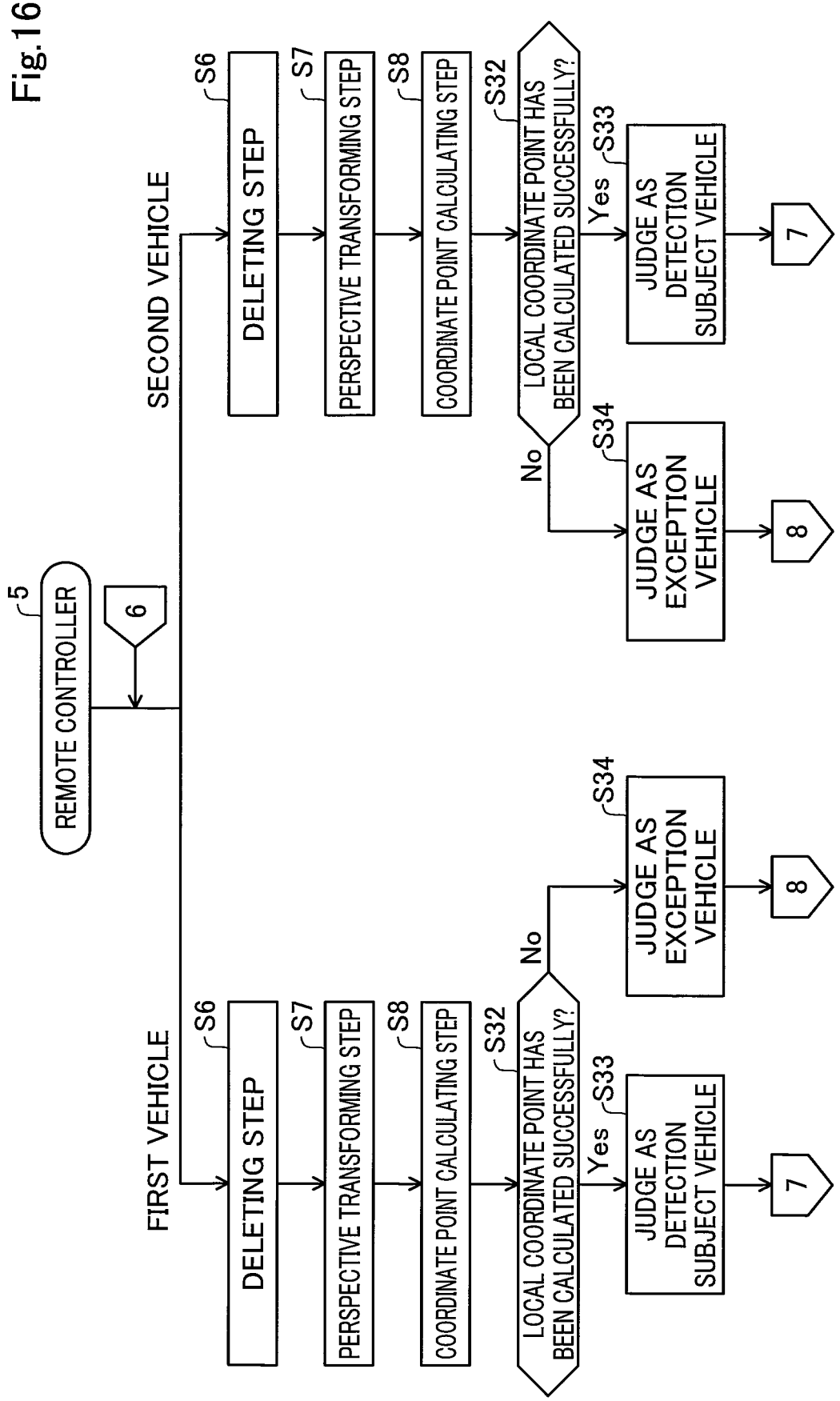
FIG. 16 is a second flowchart showing the remote control method according to the second embodiment.
Figure 17:
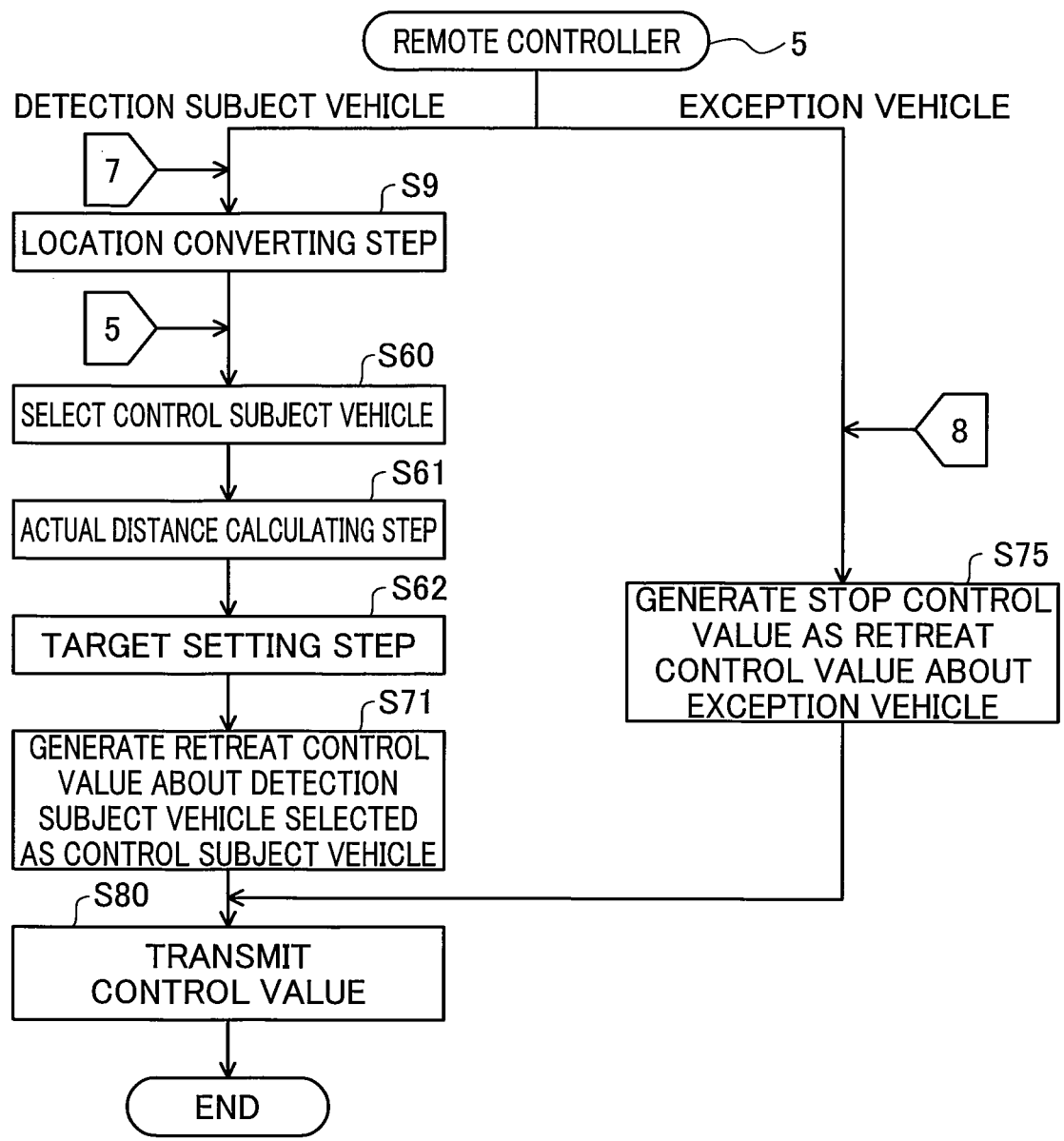
FIG. 17 is a third flowchart showing the remote control method according to the second embodiment.

FIG. 15 is a first flowchart showing a remote control method according to a second embodiment. FIG. 16 is a second flowchart showing the remote control method according to the second embodiment. FIG. 16 illustrates a processing flow employed if the captured image Im1 includes the first vehicle 101 and the second vehicle 102. FIG. 17 is a third flowchart showing the remote control method according to the second embodiment. The remote control method shown in FIGS. 15 to 17 is implemented repeatedly at a predetermined time interval after a moment when the vehicle 10 starts running in the remote automatic driving mode, for example.

In the present embodiment, the judgment unit 525 judges whether each of two or more vehicles 10 included in the captured image Im1 is classified as the detection subject vehicle 10a or as the exception vehicle 10f in response to whether the local coordinate point P3 has been calculated successfully. Thus, some of the functions of the judgment unit 525 and some of the processes of the remote control method differ from those of the first embodiment. The other configurations are the same as those of the first embodiment. A step same as a corresponding step of the first embodiment and a structure same as a corresponding structure of the first embodiment will be given the same signs and descriptions thereof will be omitted.

As shown in FIGS. 15 and 16, if the judgment unit 525 judges that the second case does not apply and the first case applies (step S0: No, step S20: Yes), the remote controller 5 performs the following processes. In this case, the remote controller 5 performs the deleting step, the perspective transforming step, and the coordinate point calculating step in this order on each of two or more vehicles 10 included in the captured image Im1. At this time, it is impossible to calculate the local coordinate point P3 about the vehicle 10 having the positioning point 10e made undetectable for reason such as being overlapped with the different vehicle 10 in such a manner as to be covered at the positioning point 10e, and an error code is generated, for example. The judgment unit 525 judges whether each of the two or more vehicles 10 included in the captured image Im1 is classified as the detection subject vehicle 10a or as the exception vehicle 10f in response to whether the local coordinate point P3 has been calculated successfully. More specifically, the judgment unit 525 judges whether the local coordinate point P3 has been calculated successfully (step S32). If the judgment unit 525 judges that the local coordinate point P3 of the first vehicle 101 has been calculated successfully (step S32: Yes), the judgment unit 525 judges that the first vehicle 101 is the detection subject vehicle 10a (step S33). Meanwhile, if the judgment unit 525 judges that the local coordinate point P3 of the first vehicle 101 has not been calculated successfully (step S32: No), the judgment unit 525 judges that the first vehicle 101 is the exception vehicle 10f (step S34). Likewise, if the judgment unit 525 judges that the local coordinate point P3 of the second vehicle 102 has been calculated successfully (step S32: Yes), the judgment unit 525 judges that the second vehicle 102 is the detection subject vehicle 10a (step S33). Meanwhile, if the judgment unit 525 judges that the local coordinate point P3 of the second vehicle 102 has not been calculated successfully (step S32: No), the judgment unit 525 judges that the second vehicle 102 is the exception vehicle 10f (step S34). In response to results of the judgments from step S32 to step S34, each step shown in FIG. 17 is performed.

According to the above-described second embodiment, it is possible to judge whether each of two or more vehicles 10 included in the captured image Im1 is classified as the detection subject vehicle 10a or as the exception vehicle 10f in response to whether the local coordinate point P3 has been calculated successfully.

C. Third Embodiment

Figure 18:
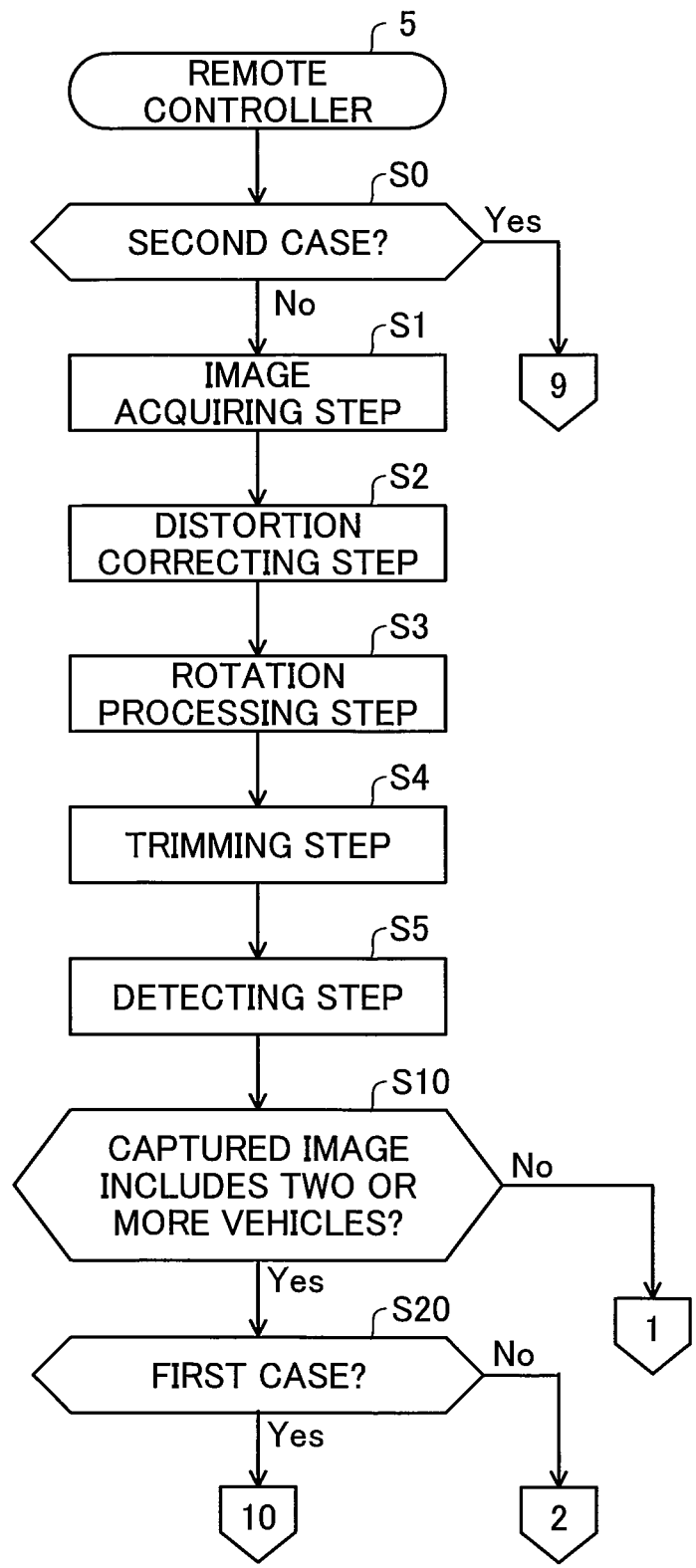
FIG. 18 is a first flowchart showing a remote control method according to a third embodiment.
Figure 19:
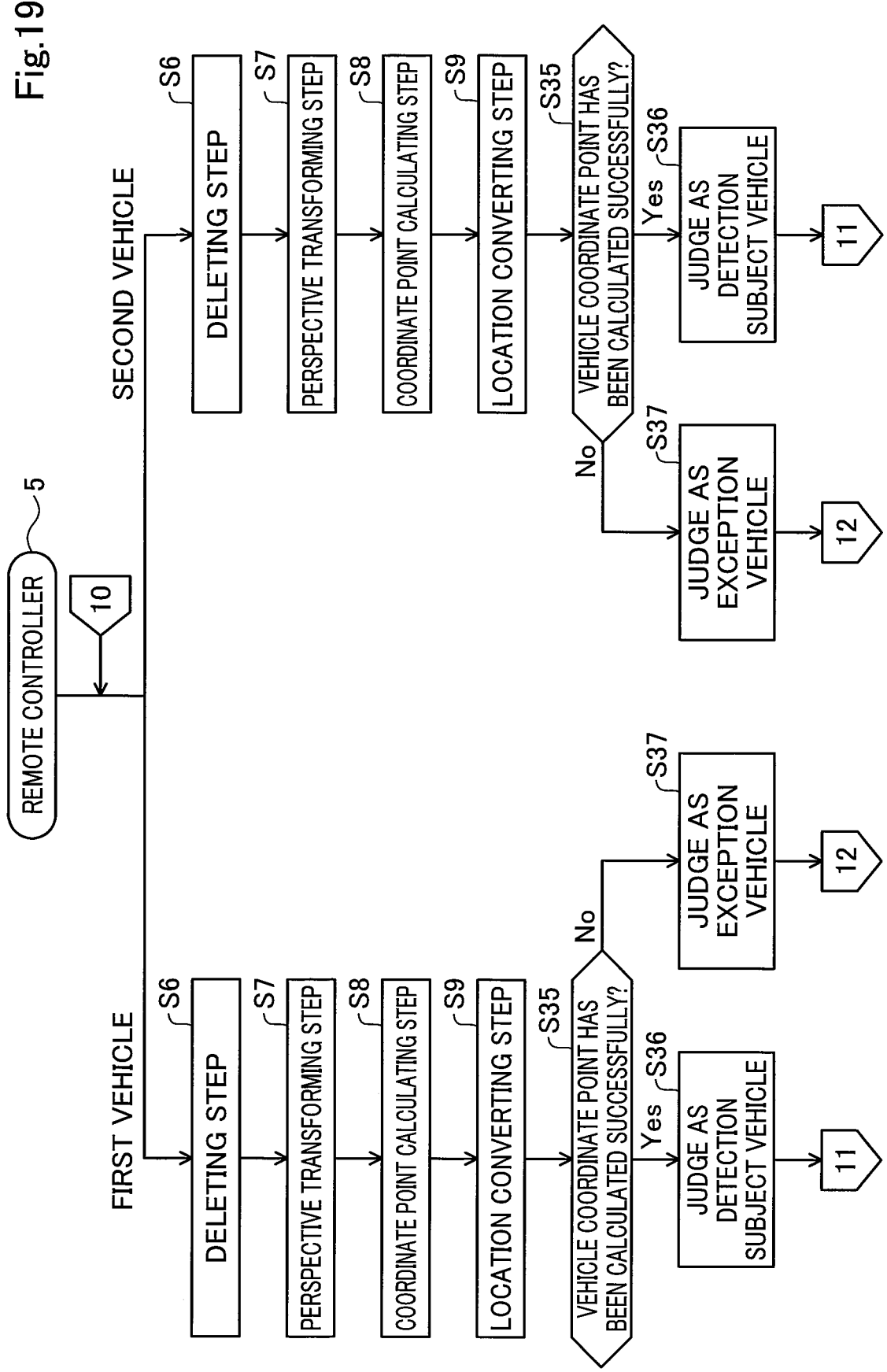
FIG. 19 is a second flowchart showing the remote control method according to the third embodiment.
Figure 20:
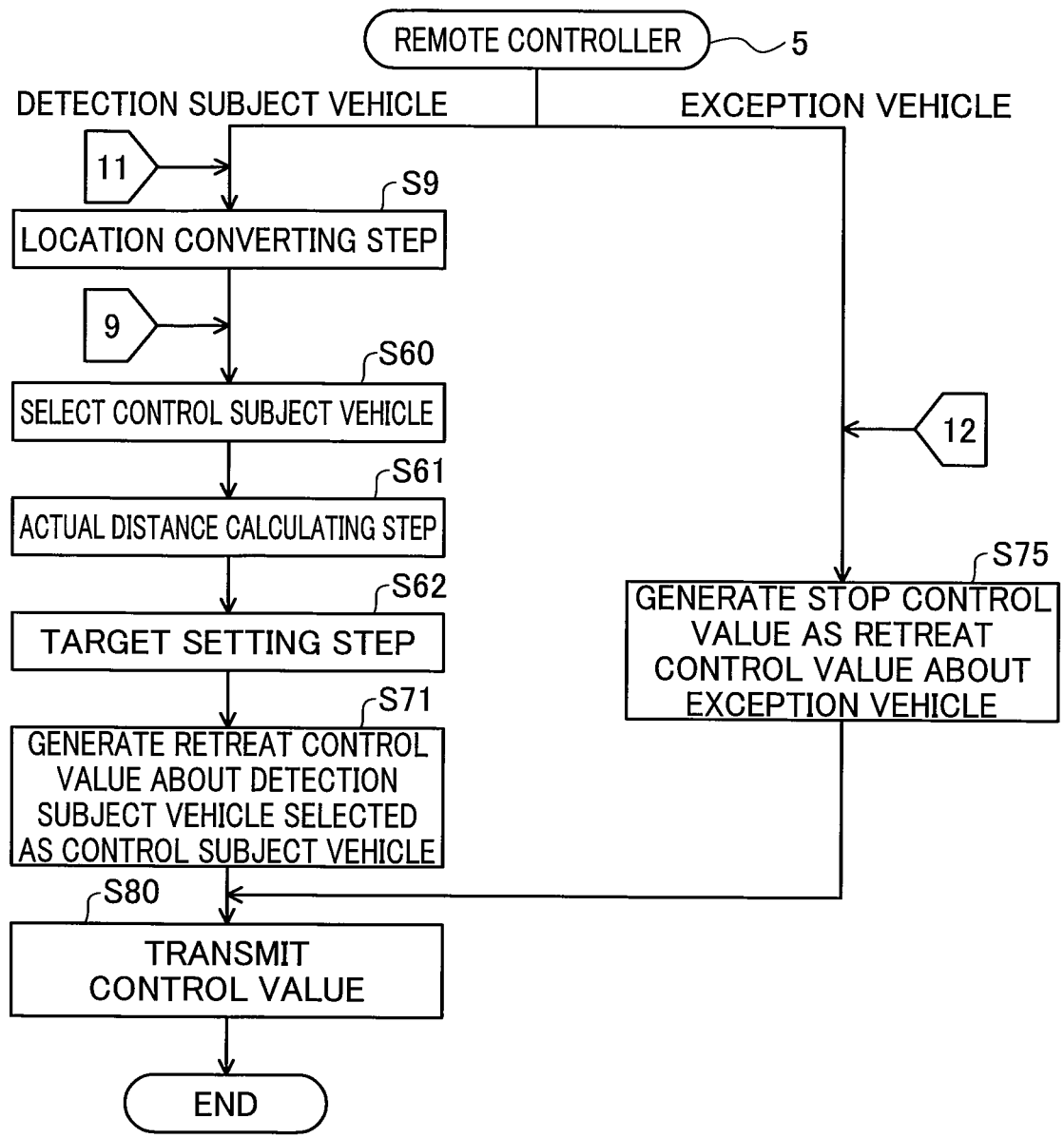
FIG. 20 is a third flowchart showing the remote control method according to the third embodiment.

FIG. 18 is a first flowchart showing a remote control method according to a third embodiment. FIG. 19 is a second flowchart showing the remote control method according to the third embodiment. FIG. 19 illustrates a processing flow employed if the captured image Im1 includes the first vehicle 101 and the second vehicle 102. FIG. 20 is a third flowchart showing the remote control method according to the third embodiment. The remote control method shown in FIGS. 18 to 20 is implemented repeatedly at a predetermined time interval after a moment when the vehicle 10 starts running in the remote automatic driving mode, for example.

In the present embodiment, the judgment unit 525 judges whether each of two or more vehicles 10 included in the captured image Im1 is classified as the detection subject vehicle 10a or as the exception vehicle 10f in response to whether the vehicle coordinate point Pv has been calculated successfully. Thus, some of the functions of the judgment unit 525 and some of the processes of the remote control method differ from those of the first embodiment. The other configurations are the same as those of the first embodiment. A step same as a corresponding step of the first embodiment and a structure same as a corresponding structure of the first embodiment will be given the same signs and descriptions thereof will be omitted.

As shown in FIGS. 18 and 19, if the judgment unit 525 judges that the second case does not apply and the first case applies (step S0: No, step S20: Yes), the remote controller 5 performs the following processes. In this case, the remote controller 5 performs the deleting step, the perspective transforming step, the coordinate point calculating step, and the location converting step in this order on each of two or more vehicles 10 included in the captured image Im1. At this time, it is impossible to calculate the vehicle coordinate point Pv about the vehicle 10 having the positioning point 10e made undetectable for reason such as being overlapped with the different vehicle 10 in such a manner as to be covered at the positioning point 10e, and an error code is generated, for example. Then, the judgment unit 525 judges whether each of the two or more vehicles 10 included in the captured image Im1 is classified as the detection subject vehicle 10a or as the exception vehicle 10f in response to whether the vehicle coordinate point Pv has been calculated successfully. More specifically, the judgment unit 525 judges whether the vehicle coordinate point Pv has been calculated successfully (step S35). If the judgment unit 525 judges that the vehicle coordinate point Pv of the first vehicle 101 has been calculated successfully (step S35: Yes), the judgment unit 525 judges that the first vehicle 101 is the detection subject vehicle 10a (step S36). Meanwhile, if the judgment unit 525 judges that the vehicle coordinate point Pv of the first vehicle 101 has not been calculated successfully (step S35: No), the judgment unit 525 judges that the first vehicle 101 is the exception vehicle 10f (step S37). Likewise, if the judgment unit 525 judges that the vehicle coordinate point Pv of the second vehicle 102 has been calculated successfully (step S35: Yes), the judgment unit 525 judges that the second vehicle 102 is the detection subject vehicle 10a (step S36). Meanwhile, if the judgment unit 525 judges that the vehicle coordinate point Pv of the second vehicle 102 has not been calculated successfully (step S35: No), the judgment unit 525 judges that the second vehicle 102 is the exception vehicle 10f (step S37). In response to results of the judgments from step S35 to step S37, each step shown in FIG. 20 is performed.

According to the above-described third embodiment, it is possible to judge whether each of two or more vehicles 10 included in the captured image Im1 is classified as the detection subject vehicle 10a or as the exception vehicle 10f in response to whether the vehicle coordinate point Pv has been calculated successfully.

D. Fourth Embodiment

Figure 21:
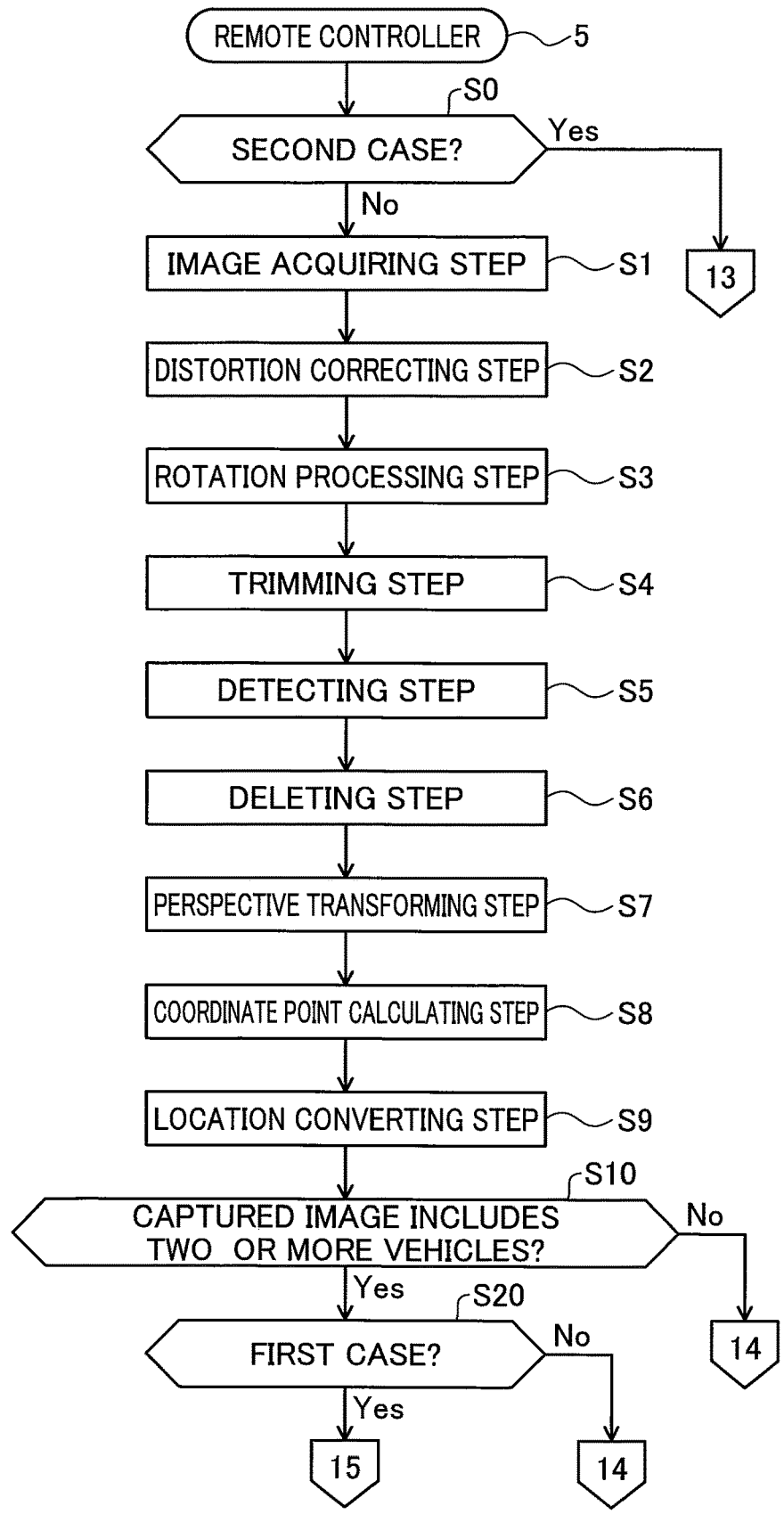
FIG. 21 is a first flowchart showing a remote control method according to a fourth embodiment.
Figure 22:
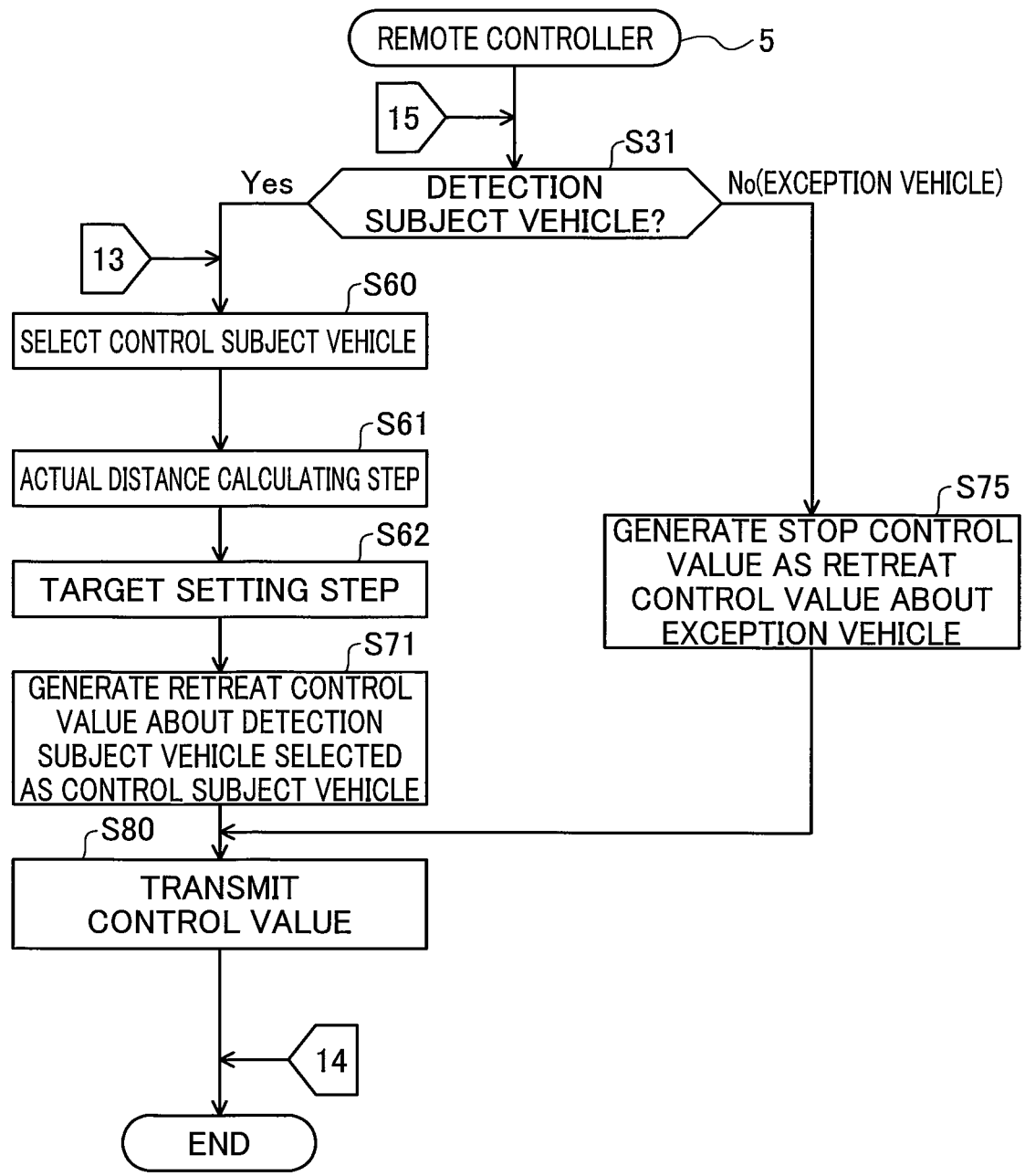
FIG. 22 is a second flowchart showing the remote control method according to the fourth embodiment.

FIG. 21 is a first flowchart showing a remote control method according to a fourth embodiment. FIG. 22 is a second flowchart showing the remote control method according to the fourth embodiment. The remote control method shown in FIGS. 21 and 22 is implemented repeatedly at a predetermined time interval after a moment when the vehicle 10 starts running in the remote automatic driving mode, for example.

In the present embodiment, the judgment unit 525 judges whether the first case applies using the vehicle coordinate point Pv calculated in the location converting step in addition to the captured image Im1. Thus, some of the functions of the judgment unit 525 and some of the processes of the remote control method differ from those of the first embodiment. The other configurations are the same as those of the first embodiment. A step same as a corresponding step of the first embodiment and a structure same as a corresponding structure of the first embodiment will be given the same signs and descriptions thereof will be omitted.

As shown in FIG. 21, if the judgment unit 525 judges that the second case does not apply (step S0: No), the remote controller 5 performs each of the steps from step S1 to step S9. If the captured image Im1 includes two or more vehicles 10 (step S10: Yes), the judgment unit 525 judges whether the first case applies using the vehicle coordinate point Pv calculated in the location converting step in addition to the captured image Im1 (step S20). Then, in response to result of the judgment in step S20, each step shown in FIG. 22 is performed.

According to the above-described fourth embodiment, it is possible to judge whether the first case applies using the vehicle coordinate point Pv indicating the location of the vehicle 10 calculated using the captured image Im1.

E. Fifth Embodiment

Figure 23:
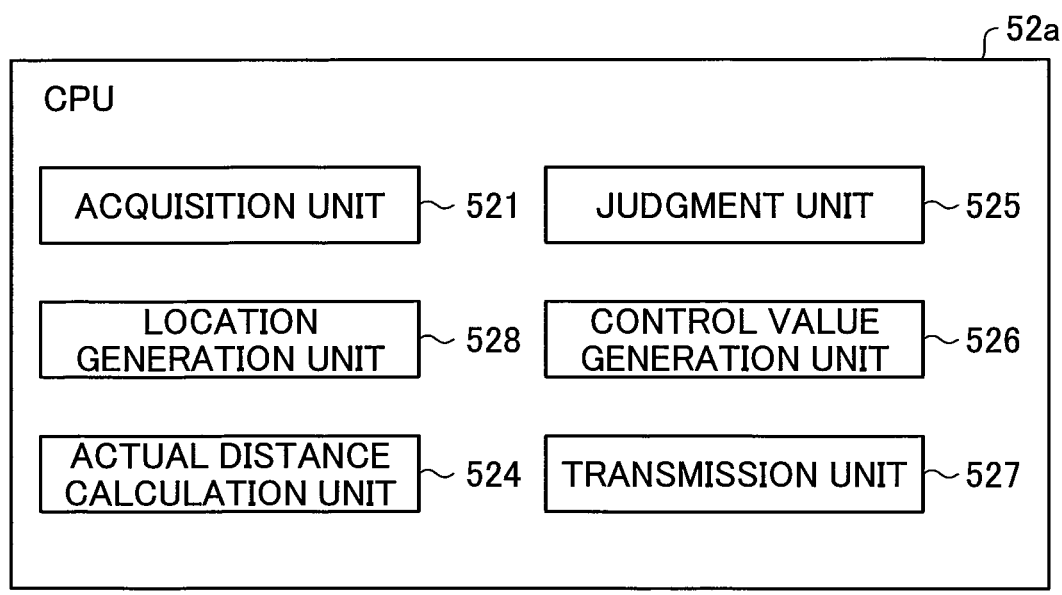
FIG. 23 is a view showing details of a CPU provided at a remote controller according to a fifth embodiment.

FIG. 23 is a view showing details of a CPU 52a provided at the remote controller 5 according to a fifth embodiment. In the present embodiment, the external sensor 9 is an external LiDAR (light detection and ranging) as a LiDAR installed at a place different from the vehicle 10. Thus, some of the functions of the remote controller 5 and a method of calculating the location of the vehicle 10 differ from those of the first embodiment. The other configurations are the same as those of the first embodiment. A structure same as a corresponding structure of the first embodiment will be given the same sign and description thereof will be omitted.

The external LiDAR is a LiDAR that detects the detection subject vehicle 10a from outside the detection subject vehicle 10a. The external LiDAR is a sensor that emits a laser beam to a predetermined detection range RF and detects a reflected beam reflected on an object such as the detection subject vehicle 10a, thereby detecting a distance and an angle between the external LiDAR and the object, the shape of the object, etc. The external LiDAR transmits the acquired external LiDAR information to the remote controller 5 together with LiDAR identification information for identifying a plurality of the external LiDARs and time of acquisition of the external LIDAR information. A location for installing the external LiDAR and the number of the external LiDARs are determined in consideration of a detection range of each external LIDAR and an object (obstacle) existing in a peripheral region around the track 6, for example, in order to capture an image of the track 6 in its entirety using one or more external LiDARs.

The CPU 52a includes a location generation unit 528 shown in FIG. 23 instead of the location calculation unit 522 and the location conversion unit 523 of the CPU 52 shown in FIG. 3. The location generation unit 528 generates the location of the detection subject vehicle 10a using external LiDAR information. The external LiDAR information is sensor information acquired by the external LiDAR. In the present embodiment, the location generation unit 528 employs a coordinate value of the positioning point 10e of the detection subject vehicle 10a in a global coordinate system as the location of the detection subject vehicle 10a.

Figure 24:
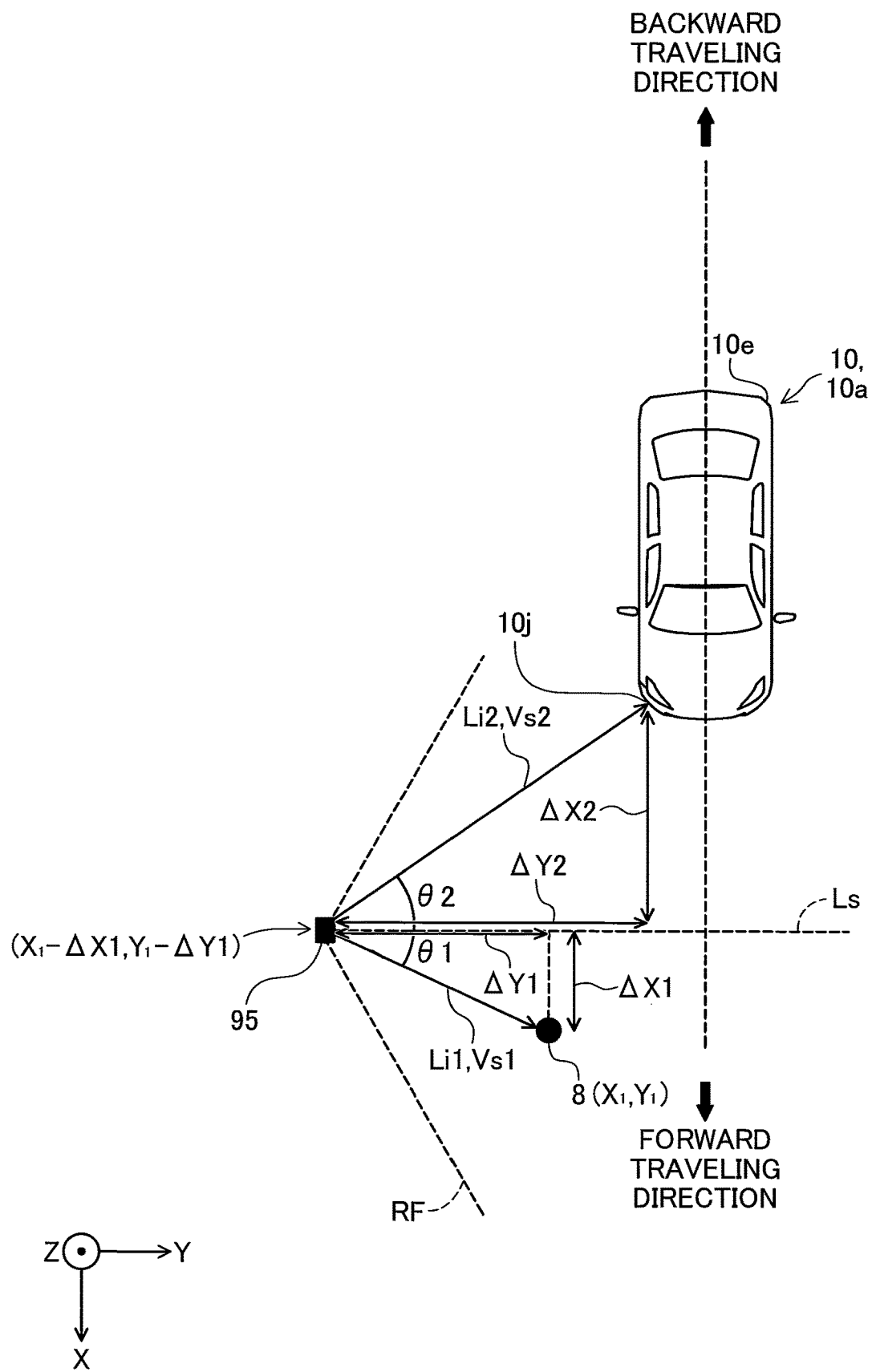
FIG. 24 is a view showing a method of calculating the location of a detection subject vehicle using an external LiDAR information.

FIG. 24 is a view showing an example of a method of calculating the location of the detection subject vehicle 10a using the external LiDAR information. The illustration in FIG. 24 includes a reference object 8 allowing a laser beam emitted from an external LiDAR 95 to be reflected thereon. The reference object 8 is a pole (mast) to which a reflector for reflecting the laser beam is attached, for example. The reference object 8 may include a plurality of the reference objects 8 installed at different locations. One of more reference objects 8 each have a known coordinate value (absolute location) in a global coordinate system. Information about the absolute location of the reference object 8 is stored in advance in the storage unit 53 of the remote controller 5, for example.

In order to calculate the location of the detection subject vehicle 10a, the location generation unit 528 calculates the location of the external LiDAR 95 using the absolute location of the reference object 8 and a first detection vector Vs1. The first detection vector Vs1 is a vector extending from the external LiDAR 95 toward the reference object 8. The first detection vector Vs1 has a distance Li1 between the external LiDAR 95 and the reference object 8, and a direction from the external LiDAR 95 to the reference object 8. In FIG. 24, the direction from the external LiDAR 95 to the reference object 8 is expressed by an angle θ1 formed between an optical axis reference Ls of the external LiDAR 95 and the first detection vector Vs1. The optical axis reference Ls of the external LiDAR 95 corresponds to a center line of the detection range RF as a range of emission of a laser beam emitted from a projector of the external LiDAR 95. Using a trigonometric function, the location generation unit 528 calculates a difference ΔX1 in coordinate value in an X direction between the external LiDAR 95 and a particular reference object 8 as one particular reference object 8 and a difference ΔY1 in coordinate value in a Y direction between the external LiDAR 95 and the particular reference object 8. Then, by considering the angular difference θ1 between the optical axis reference Ls of the external LiDAR 95 and the first detection vector Vs1, the location generation unit 528 incorporates each of the difference ΔX1 in the X direction and the difference ΔY1 in the Y direction into a coordinate value indicating the absolute location of the particular reference object 8. By doing so, the location generation unit 528 calculates the location of the external LiDAR 95 in the global coordinate system.

Next, the location generation unit 528 calculates the location of the detection subject vehicle 10*a* using the calculated location of the external LiDAR 95 and a second detection vector Vs2. The second detection vector Vs2 is a vector extending from the external LiDAR 95 toward the detection subject vehicle 10*a*. The second detection vector Vs2 has a distance Li2 between the external LiDAR 95 and the detection subject vehicle 10*a*, and a direction from the external LiDAR 95 to the detection subject vehicle 10*a*. In FIG. 24, the direction from the external LiDAR 95 to the detection subject vehicle 10*a* is expressed by an angle θ2 formed between the optical axis reference Ls of the external LiDAR 95 and the second detection vector Vs2. Using a trigonometric function, the location generation unit 528 calculates a difference ΔX2 in coordinate value in the X direction between the external LiDAR 95 and the detection subject vehicle 10*a* and a difference ΔY2 in coordinate value in the Y direction between the external LiDAR 95 and the detection subject vehicle 10*a*. Then, by considering the angular difference θ2 between the optical axis reference Ls of the external LiDAR 95 and the second detection vector Vs2, the location generation unit 528 incorporates each of the difference ΔX2 in the X direction and the difference ΔY2 in the Y direction into a coordinate value indicating the location of the external LiDAR 95. By doing so, the location generation unit 528 calculates a coordinate value of a particular part 10*j* of the detection subject vehicle 10*a* in the global coordinate system, which is a part of the detection subject vehicle 10*a* to be detected by the external LiDAR 95. Then, on the basis of a relative locational relationship between the particular part 10*j* and the positioning point 10*e* of the detection subject vehicle 10*a* and using the calculated coordinate value of the particular part 10*j* in the global coordinate system, the location generation unit 528 calculates a coordinate value of the positioning point 10*e* of the detection subject vehicle 10*a* in the global coordinate system. A method of calculating the location of the detection subject vehicle 10*a* using the external LiDAR information is not limited to the above. Furthermore, it is not essential to use information about the reference object 8 during calculation of the location of the detection subject vehicle 10*a* using the external LiDAR information.

According to the above-described fifth embodiment, it is possible to calculate the location of the detection subject vehicle 10*a* using the external LiDAR information acquired by the external LiDAR 95. Furthermore, if at least either one of the first case and the second case applies, it is possible to generate a retreat control value using the location of the detection subject vehicle 10*a* calculated on the basis of the external LIDAR information, etc., and to transmit the generated retreat control value to the control subject vehicle 10*b*. This allows reduction in a likelihood that two or more vehicles 10 will overlap each other in the external LiDAR information in tracking the location of the vehicle 10 using the external LiDAR information. Thus, it is possible to track the location of the vehicle 10 more correctly using the external LiDAR information.

F. Sixth Embodiment

Figure 25:
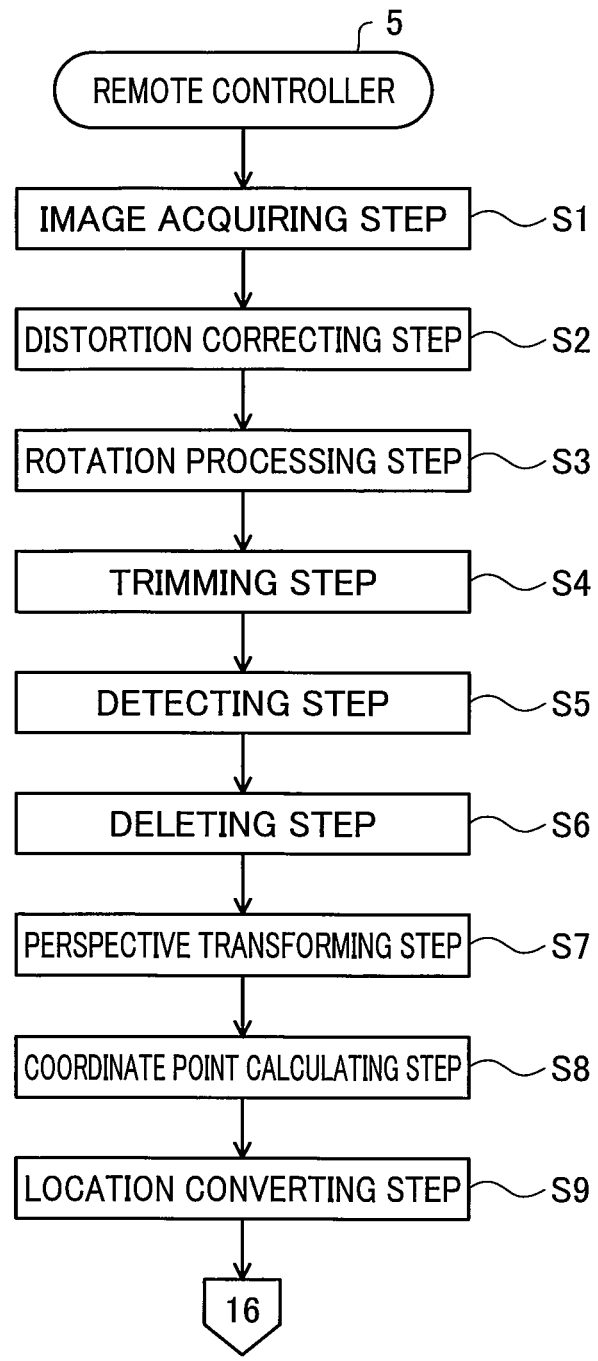
FIG. 25 is a first flowchart showing a remote control method according to a sixth embodiment.
Figure 26:
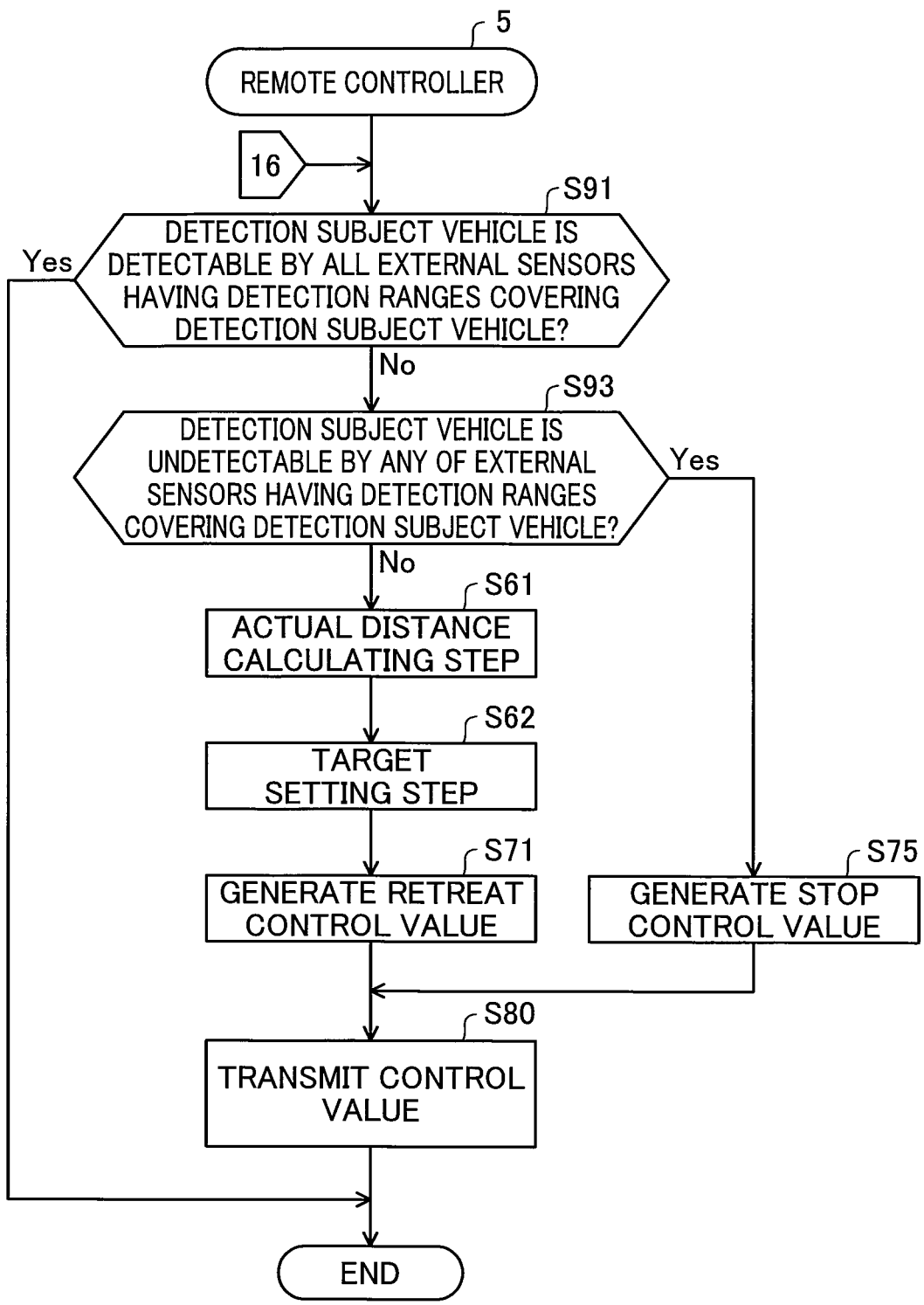
FIG. 26 is a second flowchart showing the remote control method according to the sixth embodiment.

FIG. 25 is a first flowchart showing a remote control method according to a sixth embodiment. FIG. 26 is a second flowchart showing the remote control method according to the sixth embodiment. Detecting one vehicle 10 using a plurality of external sensors 9 makes it possible to increase calculation accuracy in calculating the location of the vehicle 10 or to more correctly detect the vehicle 10 running in a boundary region between detection ranges RG and RF of a plurality of external sensors 9 next to each other. The remote control method described in the present embodiment is to calculate the location of one vehicle 10 using two or more pieces of external LiDAR information acquired by a plurality of external sensors 9 at the same acquisition moment. In the present embodiment, the detection subject vehicle 10*a* is determined in advance. The remote control method shown in FIGS. 25 and 26 is implemented repeatedly at a predetermined time interval after a moment when the vehicle 10 starts running in the remote automatic driving mode, for example. In FIGS. 25 and 26, steps same as corresponding steps of the first embodiment are given the same signs and descriptions of these steps will be omitted.

As shown in FIG. 26, if the detection subject vehicle 10*a* is detectable by any of the external sensors 9 having their detection ranges RG and RF covering the detection subject vehicle 10*a* (step S91: No, step S93: No), the actual distance calculation unit 524 calculates the actual distance L1 from the detection subject vehicle 10*a* to the vehicle 10 running without the presence of the different vehicle 10 between the detection subject vehicle 10*a* and the own vehicle 10 (step S61). Then, the control value generation unit 526 sets the target distance L2 (step S62), and generates a retreat control value (step S71). Meanwhile, if the detection subject vehicle 10*a* is undetectable by any of the external sensors 9 having their detection ranges RG and RF covering the detection subject vehicle 10*a* (step S93: Yes), the control value generation unit 526 generates a stop control value for stopping the detection subject vehicle 10*a* safely (step S75). The transmission unit 527 transmits the control value generated by the control value generation unit 526 to the control subject vehicle 10*b* (step S80). If the vehicle 10 is detectable by all of the external sensors 9 having their detection ranges RG and RF covering the vehicle 10 (step S91: Yes), the remote control method is finished.

According to the above-described sixth embodiment, if the location of one vehicle 10 is calculated using two or more pieces of external LiDAR information acquired by a plurality of the external sensors 9 at the same acquisition moment, it is also possible to reduce a likelihood that two or more vehicles 10 will overlap each other in sensor information. This allows the location of the vehicle 10 to be calculated still more correctly using the sensor information.

According to the above-described sixth embodiment, it is possible to calculate the location of one detection subject vehicle 10a using a plurality of the external sensors 9. By doing so, if the detection subject vehicle 10a is detectable by any of the external sensors 9 having their detection ranges RG and RF covering the detection subject vehicle 10a, stopping the detection subject vehicle 10a from a viewpoint of ensuring safety is not required. This allows the vehicle 10 to run continuously in the remote automatic driving mode. As a result, it is possible to reduce the occurrence of delay in moving of the vehicle 10.

G. Other Embodiments

G-1. Another Embodiment 1

The control value generation unit 526 may set the target distance L2 using the actual distance L1 between the first vehicle 101 and the second vehicle 102 overlapping each other or expected to overlap each other in sensor information, the sensor information, and the vehicle type database D2. In this case, the vehicle type database D2 further includes information about the required distance L3. In this case, the required distance L3 is a constant responsive to a combination of the type of the first vehicle 101 and the type of the second vehicle 102. In setting the target distance L2 in response to the predetermined required distance L3, the control value generation unit 526 acquires vehicle type identification information indicating the type of the first vehicle 101 and vehicle type identification information indicating the type of the second vehicle 102. Then, by referring to the vehicle type database D2, the control value generation unit 526 acquires the required distance L3 responsive to the combination of the type of the first vehicle 101 and the type of the second vehicle 102 identified using the vehicle type identification information. If the actual distance L1 between the first vehicle 101 and the second vehicle 102 overlapping each other or expected to overlap each other in the sensor information is equal to or less than the required distance L3, the control value generation unit 526 generates a retreat control value by setting the acquired required distance L3 to the target distance L2, for example. Meanwhile, if the actual distance L1 between the first vehicle 101 and the second vehicle 102 is larger than the required distance L3, the control value generation unit 526 sets an arbitrary distance larger than the actual distance L1 to the target distance L2, for example. This embodiment allows the target distance L2 to be set easily.

G-2. Another Embodiment 2

The judgment unit 525 may judge whether the second case applies only in response to the type of the vehicle 10 without acquiring shape information. Even in this embodiment, it is still possible to judge whether the second case applies.

G-3. Another Embodiment 3

The judgment unit 525 may judge whether the second case applies only using the actual distance L1 between the first vehicle 101 and the second vehicle 102 expected to overlap each other in sensor information when the sensor information is acquired. In this case, if the actual distance L1 between the first vehicle 101 and the second vehicle 102 is less than a predetermined distance threshold, for example, the judgment unit 525 judges that the second case applies. Meanwhile, if the actual distance L1 between the first vehicle 101 and the second vehicle 102 is equal to or greater than the distance threshold, the judgment unit 525 judges that the second case does not apply. In this embodiment, it is possible to easily judge whether the second case applies.

G-4. Another Embodiment 4

The judgment unit 525 may judge whether the second case applies using the actual distances L1 between the first vehicle 101 and the second vehicle 102 calculated at a plurality of different moments. In this case, the judgment unit 525 arranges the actual distances L1 calculated at the plurality of different moments in chronological order, for example. Then, the judgment unit 525 judges that the second case applies if the actual distance L1 becomes more approximate to zero with greater closeness to a moment when it is judged whether the second case applies in the chronological order. In this embodiment, by grasping chronological change of the actual distances L1 between the first vehicle 101 and the second vehicle 102 calculated at the plurality of different moments, it becomes possible to judge whether the second case applies.

G-5. Another Embodiment 5

The judgment unit 525 may judge whether the second case applies using the actual distances L1 between the first vehicle 101 and the second vehicle 102 calculated at a plurality of different moments. In this case, the judgment unit 525 arranges first differences in chronological order each indicating a difference in the actual distance L1 between a first moment and a calculation moment immediately before the first moment, for example. The first difference is a value obtained by subtracting the actual distance L1 calculated at the calculation moment immediately before the first moment from the actual distance L1 calculated at the first moment. Then, the judgment unit 525 judges that the second case applies if the difference between the actual distances L1 becomes smaller with greater closeness to a moment when it is judged whether the second case applies in the chronological order. In this embodiment, by grasping chronological change of the difference in the actual distances L1 between the first vehicle 101 and the second vehicle 102 calculated at the plurality of different moments, it becomes possible to judge whether the second case applies.

G-6. Another Embodiment 6

The judgment unit 525 may judge whether the second case applies using the actual distances L1 between the first vehicle 101 and the second vehicle 102 calculated at a plurality of different moments. In this case, the judgment unit 525 calculates a function indicating a time-series graph generated by arranging the actual distances L1 calculated at a plurality of the different moments in chronological order and connecting the actual distances L1 at the respective moments to each other, for example. Then, the judgment unit 525 differentiates the function to calculate a slope of the time-series graph. The judgment unit 525 makes absolute comparison of comparing the slope of the time-series graph with a predetermined differential threshold, thereby judging whether the second case applies. In this embodiment, it is possible to express chronological change of a difference in the actual distances L1 between the first vehicle 101 and the second vehicle 102 calculated at the plurality of different moments quantitatively using a differential value.

G-7. Another Embodiment 7

The judgment unit 525 may judge whether the second case applies using the actual distances L1 between the first vehicle 101 and the second vehicle 102 calculated at a plurality of different moments. In this case, the judgment unit 525 calculates a second difference, for example. The second difference is a value obtained by subtracting the actual distance L1 calculated at a calculation moment immediately before a calculation moment most approximate to a judgment moment when it is judged whether the second case applies from the actual distance L1 calculated at the calculation moment most approximate to the judgment moment. Then, the judgment unit 525 judges that the second case applies if the second difference is less than a predetermined difference threshold. Meanwhile, if the second difference is equal to or greater than the predetermined difference threshold, the judgment unit 525 judges that the second case does not apply. In this embodiment, by making the absolute comparison of comparing the difference in the actual distances L1 between the first vehicle 101 and the second vehicle 102 calculated at the plurality of different moments with the predetermined difference threshold, it becomes possible to judge whether the second case applies.

G-8. Another Embodiment 8

In each of the above-described embodiments, the vehicle 10 is simply required to have a configuration movable by remote control. The vehicle 10 may be configured as a platform having the following configuration, for example. More specifically, in order to fulfill three functions including "run," "turn," and "stop" by remote control, the vehicle 10 is simply required to include at least the driving device 110, the steering device 120, the braking device 130, the vehicle communication unit 140, and the vehicle controller 150. Specifically, the vehicle 10 movable by remote control may not be required to be equipped with at least some of interior parts such as a driver's seat and a dashboard, may not be required to be equipped with at least some of exterior parts such as a bumper and a fender, or may not be required to be equipped with a bodyshell. In such cases, a remaining part such as a bodyshell may be mounted on the vehicle 10 before the vehicle 10 is shipped from a factory, or the vehicle 10 may be shipped from the factory without a remaining part such as a bodyshell on the vehicle 10 and then the remaining part such as a bodyshell may be mounted on the vehicle 10. In the case of the configuration as a platform, it is also possible to calculate a location in the same way as that used for the vehicle 10 according to each of the embodiments.

F. Other Embodiments (F1) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 10. The server 5 and the vehicle 10 may acquire the vehicle location information through template matching using the three-dimensional point cloud data as the detection result and reference point cloud data, for example.

(F2) In the above-described embodiment in which the vehicle 10 can be running by autonomous control, the vehicle 10 may be equipped with an internal sensor, and detection result output from the internal sensor may be used in at least one of generation of a route and generation of a running control signal. For example, the vehicle 10 may acquire detection result from the internal sensor, and in generating the route, may reflect the detection result from the internal sensor in the route. The vehicle 10 may acquire detection result from the internal sensor, and in generating the running control signal, may reflect the detection result from the internal sensor in the running control signal.

(F3) In the above-described embodiment in which the vehicle 10 can be running by autonomous control, the vehicle 10 acquires vehicle location information using detection result from the external sensor. By contrast, the vehicle 10 may be equipped with an internal sensor, the vehicle 10 may acquire vehicle location information using detection result from the internal sensor, determine a target location to which the vehicle 10 is to move next, generate a route from a current location of the vehicle 10 indicated by the acquired vehicle location information to the target location, generate a running control signal for running along the generated route, and control an actuator of the vehicle 10 using the generated running control signal. In this case, the vehicle 10 is capable of running without using any detection result from an external sensor. The vehicle 10 may acquire target arrival time or traffic congestion information from outside the vehicle 10 and reflect the target arrival time or traffic congestion information in at least one of the route and the running control signal. The functional configuration of the system 1 may be entirely provided at the vehicle 10. Specifically, the processes realized by the system 1 in the present disclosure may be realized by the vehicle 10 alone.

(F4) In the above-described first embodiment, the server 5 automatically generates a running control signal to be transmitted to the vehicle 10. By contrast, the server 5 may generate a running control signal to be transmitted to the vehicle 10 in response to operation by an external operator existing outside the vehicle 10. For example, the external operator may operate an operating device including a display on which a captured image output from the external sensor is displayed, steering, an accelerator pedal, and a brake pedal for operating the vehicle 10 remotely, and a communication device for making communication with the server 5 through wire communication or wireless communication, for example, and the server 5 may generate a running control signal responsive to the operation on the operating device.

(F5) In each of the above-described embodiments, the vehicle 10 is simply required to have a configuration to become movable by unmanned driving. The vehicle 10 may embodied as a platform having the following configuration, for example. The vehicle 10 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 10. In order for the vehicle 10 to acquire information from outside for unmanned driving, the vehicle 10 is simply required to include the communication device further. Specifically, the vehicle 10 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 10 before the vehicle 10 is shipped from a factory, or a remaining component such as a bodyshell may be mounted on the vehicle 10 after the vehicle 10 is shipped from a factory while the remaining component such as a bodyshell is not mounted on the vehicle 10. Each of components may be mounted on the vehicle 10 from any direction such as from above, from below, from the front, from the back, from the right, or from the left. Alternatively, these components may be mounted from the same direction or from respective different directions. The location determination for the platform may be performed in the same way as for the vehicle 10 in the first embodiments.

(F6) The vehicle 10 may be manufactured by combining a plurality of modules. The module means a unit composed of one or more components grouped according to a configuration or function of the vehicle 10. For example, a platform of the vehicle 10 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 10 different from the platform may be modularized. Various modules may include an arbitrary exterior component such as a bumper or a grill, or an arbitrary interior component such as a seat or a console. Not only the vehicle 10 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(F7) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary.

What is claimed is:

1. A remote controller that remotely controls running motion of at least one of a plurality of moving objects, comprising:
   an acquisition unit that acquires sensor information acquired by a sensor installed at a place different from the plurality of moving objects, the sensor information indicating the at least one of the plurality of moving objects;
   a detection unit that detects the moving object included in the sensor information;
   a control value generation unit that generates a control value for defining the running motion of each of the at least one of the plurality of moving objects using the sensor information; and
   a transmission unit that transmits the control value to a control subject moving object of the plurality of moving objects as a subject of control in the running motion, wherein
   the control value generation unit generates a retreat control value if at least either one of a first case and a second case applies, the first case being a case where two or more of the moving objects of the plurality of moving objects overlap each other in the sensor information, the second case being a case where an expectation is established before acquisition of the sensor information that the two or more moving objects overlap each other when the sensor information is acquired, the retreat control value being generated as the control value for defining the running motion of at least any of the two or more moving objects in order to establish a locational relationship allowing a detection subject moving object of the two or more moving objects as a subject of detection using the sensor information to be detected by the detection unit without causing an overlap of the detection subject moving object with other of the plurality of moving objects.

2. The remote controller according to claim 1, wherein
   the first case is a case where a first moving object and a second moving object of the plurality of moving objects overlap each other in the sensor information,
   the second case is a case where an expectation is established before acquisition of the sensor information that the first moving object and the second moving object overlap each other when the sensor information is acquired,
   the remote controller further comprises an actual distance calculation unit that calculates an actual distance between the first moving object and the second moving object, and
   the retreat control value is the control value for defining the running motion of at least one of the first moving object and the second moving object in order for the actual distance to become a target distance longer than the actual distance at a moment when at least either one of the first case and the second case applies.

3. The remote controller according to claim 2, wherein the target distance is set in response to an appearance shape of the first moving object and an appearance shape of the second moving object,
the target distance becomes longer as the appearance shape of the first moving object and the appearance shape of the second moving object become larger, and the target distance becomes shorter as the appearance shape of the first moving object and the appearance shape of the second moving object become smaller.

4. The remote controller according to claim 2, wherein the second moving object is the moving object running behind the first moving object in the same forward traveling direction as the first moving object, and
the retreat control value includes at least one of:
an acceleration control value for increasing an acceleration of the first moving object in the forward traveling direction;
an acceleration control value for reducing an acceleration of the second moving object in the forward traveling direction;
a direction control value for moving the second moving object backward in a direction opposite the forward traveling direction; and
a stop control value for stopping the running motion of the second moving object.

5. The remote controller according to claim 4, wherein the retreat control value further includes a rudder angle control value for defining a rudder angle of the control subject moving object.

6. The remote controller according to claim 2, wherein the retreat control value includes a rudder angle control value for defining a rudder angle of the control subject moving object in order to move either one of the first moving object and the second moving object in a width direction of a track.

7. The remote controller according to claim 6, wherein the retreat control value further includes an acceleration control value for defining an acceleration of the control subject moving object.

8. The remote controller according to claim 2, wherein the second moving object is the moving object running behind the first moving object in the same forward traveling direction as the first moving object, and
the retreat control value is the control value for causing the second moving object to pass the first moving object by moving either one of the first moving object and the second moving object in a width direction of a track, and includes an acceleration control value for defining an acceleration of the control subject moving object and a rudder angle control value for defining a rudder angle of the control subject moving object.

9. The remote controller according to claim 2, wherein the retreat control value includes an orbit control value for defining a running path by arranging predetermined time-based target running locations of the control subject moving object in chronological order.

10. The remote controller according to claim 1, comprising:
a judgment unit that judges whether the second case applies in response to the type of each of the two or more moving objects expected to be included in the sensor information when the sensor information is acquired.

11. The remote controller according to claim 1, comprising:
a judgment unit that judges whether the second case applies in response to an appearance shape of the moving object differing between the types of the moving objects, the appearance shape being an appearance shape of each of the two or more moving objects expected to be included in the sensor information when the sensor information is acquired.

12. A remote control system comprising:
a plurality of moving objects:
a sensor installed at a place different from the plurality of moving objects, the sensor acquiring sensor information indicating at least one of the plurality of moving objects; and
the remote controller according to claim 1.

13. A remote control method of remotely controlling running motion of each of at least one of a plurality of moving objects, comprising:
an acquiring step of acquiring sensor information acquired by a sensor installed at a place different from the plurality of moving objects, the sensor information indicating the at least one of the plurality of moving objects;
a detecting step of detecting the moving object included in the sensor information;
a control value generating step of generating a control value for defining the running motion of each of the at least one of the plurality of moving objects using the sensor information; and
a transmitting step of transmitting the control value to a control subject moving object of the plurality of moving objects as a subject of control in the running motion, wherein
in the control value generating step, a retreat control value is generated if at least either one of a first case and a second case applies, the first case being a case where two or more of the moving objects of the plurality of moving objects overlap each other in the sensor information, the second case being a case where an expectation is established before acquisition of the sensor information that the two or more moving objects overlap each other when the sensor information is acquired, the retreat control value being generated as the control value for defining the running motion of at least any of the two or more moving objects in order to establish a locational relationship allowing a detection subject moving object of the two or more moving objects as a subject of detection using the sensor information to be detected in the detecting step without causing an overlap of the detection subject moving object with other of the plurality of moving objects.

* * * * *